US009389821B2

(12) United States Patent
Mihira et al.

(10) Patent No.: US 9,389,821 B2
(45) Date of Patent: Jul. 12, 2016

(54) PRINTING AND PRINTING CONTROL INCLUDES DETERMINING WHETHER TO SET SHEET ATTRIBUTE INFORMATION OF SHEETS IN SHEET HOLDING UNITS

(71) Applicant: CANON KABUSHIKI KAISHA, Tokyo (JP)

(72) Inventors: Yoshiro Mihira, Inagi (JP); Takaaki Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/562,518

(22) Filed: Dec. 5, 2014

(65) Prior Publication Data
US 2015/0160903 A1 Jun. 11, 2015

(30) Foreign Application Priority Data

Dec. 9, 2013 (JP) ................................ 2013-254563

(51) Int. Cl.
*G06K 15/02* (2006.01)
*G06F 3/12* (2006.01)
*H04N 1/00* (2006.01)
*G06K 15/00* (2006.01)

(52) U.S. Cl.
CPC ............ *G06F 3/1257* (2013.01); *G06F 3/1204* (2013.01); *G06F 3/1205* (2013.01); *G06F 3/1212* (2013.01); *G06F 3/1253* (2013.01); *G06F 3/1258* (2013.01); *G06F 3/1288* (2013.01); *G06K 15/002* (2013.01); *G06K 15/1803* (2013.01); *G06K 15/1805* (2013.01); *G06K 15/402* (2013.01); *G06K 15/4065* (2013.01); *H04N 1/00482* (2013.01); *H04N 1/00954* (2013.01)

(58) Field of Classification Search
None
See application file for complete search history.

(56) References Cited

U.S. PATENT DOCUMENTS

| | | | | |
|---|---|---|---|---|
| 6,285,844 B1 * | 9/2001 | Kuga | ................. | H04N 1/00567 399/85 |
| 6,850,337 B1 * | 2/2005 | Pentecost | .............. | G06F 3/1207 358/1.12 |
| 7,317,882 B2 * | 1/2008 | Dombrowski | ..... | G03G 15/6508 399/81 |
| 7,826,073 B2 * | 11/2010 | Park | ................... | H04N 1/00482 358/1.13 |
| 8,451,496 B2 * | 5/2013 | Ohashi | .................. | G06F 3/1208 358/1.13 |
| 8,630,014 B2 * | 1/2014 | Fujiwara | ............... | G06F 3/1255 358/1.2 |

(Continued)

FOREIGN PATENT DOCUMENTS

JP 2007-241425 A 9/2007

*Primary Examiner* — Scott A Rogers
(74) *Attorney, Agent, or Firm* — Canon USA, Inc. IP Division

(57) ABSTRACT

A printing system includes a printing apparatus and a printing control apparatus. The printing apparatus obtains first attribute information about a sheet stored in a sheet holding unit of the printing apparatus and sends the first attribute information to the printing control apparatus. The printing control apparatus stores a combination of the first attribute information and second attribute information about a sheet, obtains the second attribute information based on received first attribute information, and sends the second attribute information to the printing apparatus. The printing apparatus and sets received second attribute information as attribute information about the sheet stored in the sheet holding unit. Where setting of the second attribute information is designated, the printing apparatus causes the setting unit to set the second attribute information. Where setting of the second attribute information is not designated, the printing apparatus restricts the setting unit from setting the second attribute information.

20 Claims, 18 Drawing Sheets

(56) References Cited

U.S. PATENT DOCUMENTS

| | | | | |
|---|---|---|---|---|
| 8,670,161 B2* | 3/2014 | Salgado | G06F 3/1255 | 358/1.14 |
| 8,937,740 B2* | 1/2015 | Sakata | G06K 15/4065 | 358/1.15 |
| 8,994,971 B2* | 3/2015 | Fukuda | G06K 15/4065 | 358/1.12 |
| 9,019,522 B2* | 4/2015 | Shibata | G06F 3/1258 | 358/1.14 |
| 9,141,322 B2* | 9/2015 | Iida | G06F 3/1258 | |
| 2002/0036799 A1* | 3/2002 | Sumiyama | G06F 3/1205 | 358/1.15 |
| 2003/0231359 A1* | 12/2003 | Hayashi | H04N 1/00925 | 358/498 |
| 2007/0263242 A1* | 11/2007 | Takahashi | G06F 3/1204 | 358/1.14 |
| 2010/0111546 A1* | 5/2010 | Kubo | G03G 15/6508 | 399/16 |
| 2010/0157326 A1* | 6/2010 | Mori | G03G 15/5029 | 358/1.5 |
| 2011/0242584 A1* | 10/2011 | Igarashi | G06F 3/1205 | 358/1.15 |
| 2015/0002881 A1* | 1/2015 | Koike | G06F 3/1294 | 358/1.14 |
| 2015/0015916 A1* | 1/2015 | Kikuchi | G06K 15/1848 | 358/3.24 |
| 2015/0043035 A1* | 2/2015 | Iida | G06F 3/1258 | 358/1.15 |
| 2015/0160902 A1* | 6/2015 | Tsujita | G06F 3/1257 | 358/1.6 |
| 2015/0213347 A1* | 7/2015 | Anno | G06K 15/4065 | 358/1.9 |

* cited by examiner

SHEET INFORMATION REGISTRATION

| ID | NAME | SIZE | GRAMMAGE | COLOR | TYPE |
|---|---|---|---|---|---|
| 001 | A CORPORATION Media1 | A4 | 62 g/m$^2$ | White | PLAIN PAPER |
| 002 | A CORPORATION Media2 | A4 | 80 g/m$^2$ | Yellow | PLAIN PAPER |
| 003 | A CORPORATION Custom | A4 | 62 g/m$^2$ | Red | PLAIN PAPER |
| 004 | B CORPORATION Premium | A3 | 128 g/m$^2$ | White | THICK PAPER |
| 005 | C CORPORATION Excellent | B4 | 150 g/m$^2$ | White | THICK PAPER |
| 006 | Paper1 | A3 | 64 g/m$^2$ | Blue | COATED PAPER |
| 007 | Paper2 | A3 | 80 g/m$^2$ | White | PLAIN PAPER |
| 008 | MyPaper | A4 | 100 g/m$^2$ | Yellow | TAB SHEET |
| ... | ... | ... | ... | ... | ... |

[ ADDITION ]   [ DELETE ]   [ CLOSE ]

NEW ADDITION

NAME: [ A CORPORATION Media1 ]

SHEET CHARACTERISTICS (TYPE/GRAMMAGE/COLOR): [ PLAIN PAPER, 62 g/m$^2$, White ▼ ]  [ CUSTOM... ]

OUTPUT SHEET SIZE: [ A4 ▼ ]  [ CUSTOM... ]

[ REGISTRATION ]   [ CANCEL ]

SHEET HOLDING UNIT REGISTRATION

FREQUENTLY USED SHEET CAN BE ASSOCIATED WITH SHEET HOLDING UNIT.

| SHEET HOLDING UNIT | NAME | SIZE | GRAMMAGE/COLOR/TYPE |
|---|---|---|---|
| 1 | A CORPORATION Media1 | A4 | 62 g/m$^2$, White, PLAIN PAPER |
| 2 | Paper2 | A3 | 80 g/m$^2$, White, PLAIN PAPER |
| 3 | C CORPORATION Excellent | B4 | 150 g/m$^2$, White, THICK PAPER |
| 4 |  |  |  |

[ ADDITION ]   [ DELETE ]   [ CLOSE ]

| SHEET HOLDING UNIT | NAME | SIZE | GRAMMAGE | COLOR | TYPE |
|---|---|---|---|---|---|
| Tray1 | A CORPORATION Media1 | A4 | 62 g/m$^2$ | White | PLAIN PAPER |
| | Paper2 | A3 | 80 g/m$^2$ | White | PLAIN PAPER |
| | C CORPORATION Excellent | B4 | 150 g/m$^2$ | White | THICK PAPER |
| Tray2 | | | | | |
| Tray3 | MyPaper | A4 | 100 g/m$^2$ | White | TAB SHEET |
| | B CORPORATION Premium | A3 | 128 g/m$^2$ | White | THICK PAPER |
| Tray4 | A CORPORATION Media1 | A4 | 62 g/m$^2$ | White | PLAIN PAPER |

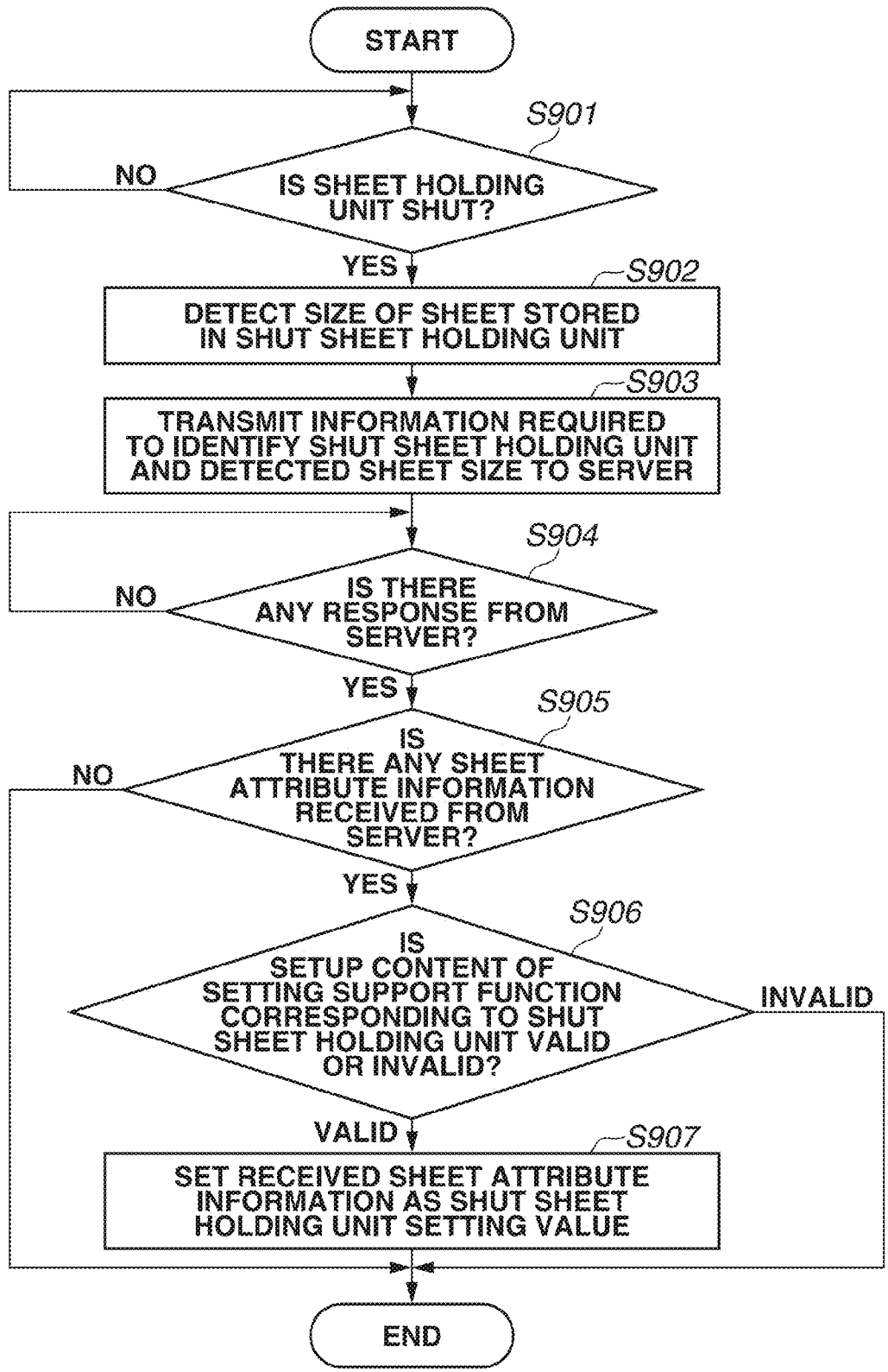

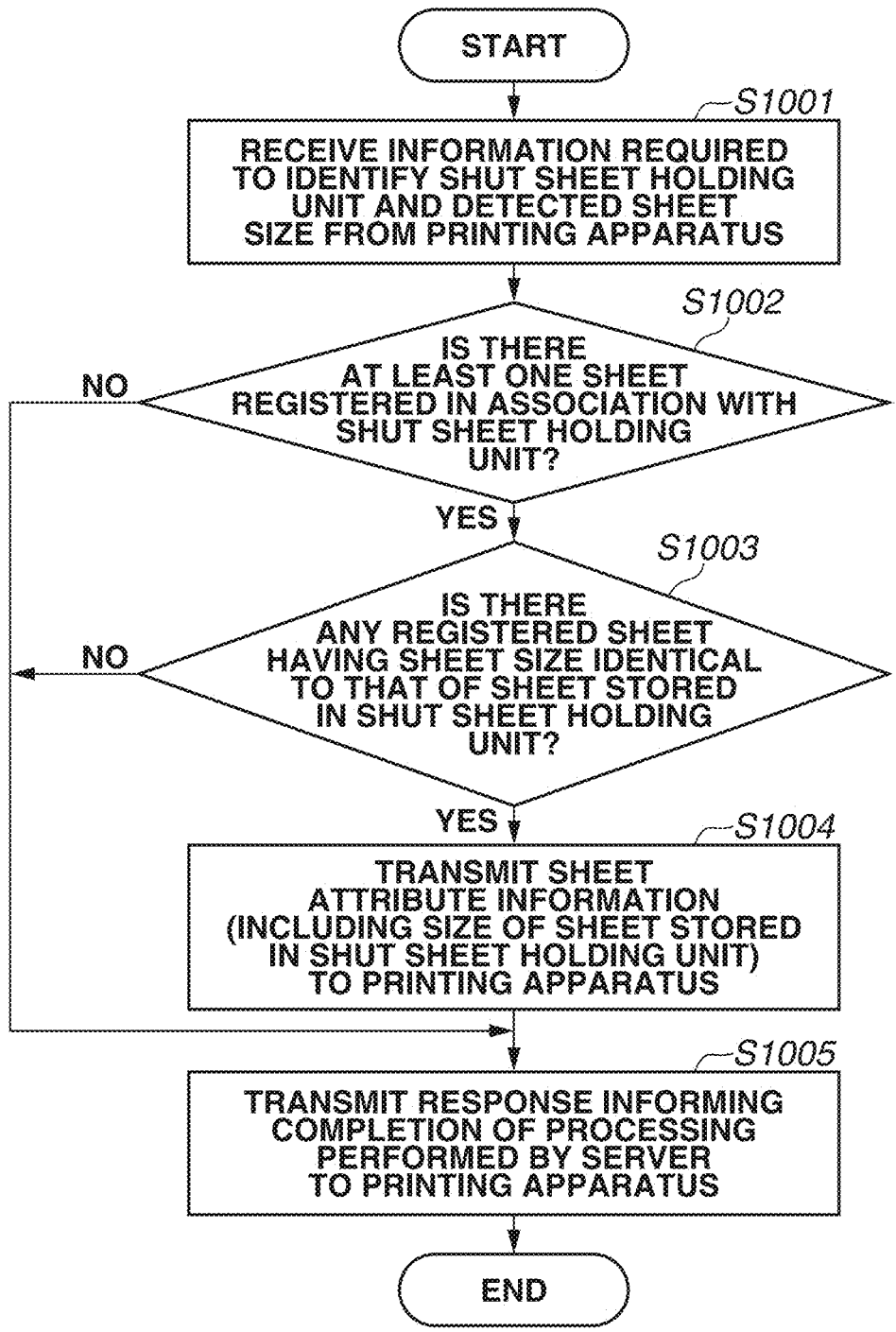

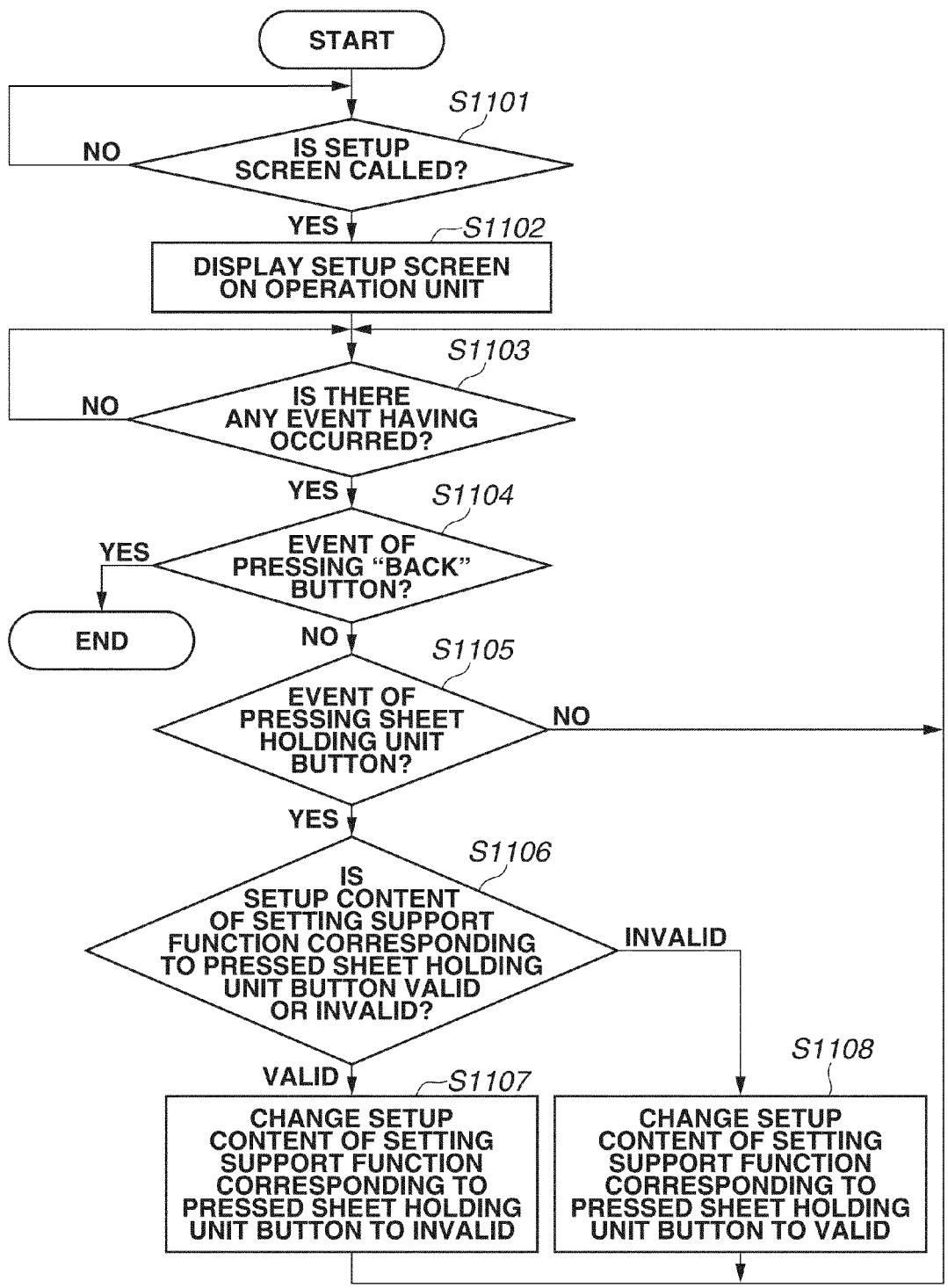

FIG.16

| SHEET HOLDING UNIT 1600 | OPENED TIME 1601 | SHUT TIME 1602 | SHEET REMAINING AMOUNT AT OPENED TIMING 1603 | SHEET REMAINING AMOUNT AT SHUT TIMING 1604 |
|---|---|---|---|---|
| 1 | 2013/4/1 10:05:30 | 2013/4/1 10:08:42 | 0% (REMAINING AMOUNT ZERO) | 100% |
| 2 | 2013/4/3 13:30:08 | 2013/4/3 13:30:11 | 25% | 100% |
| 3 | 2013/4/3 13:31:15 | 2013/4/3 13:32:50 | 100% | 75% |
| 4 | 2013/4/3 13:48:55 | 2013/4/3 14:00:08 | 50% | 50% |

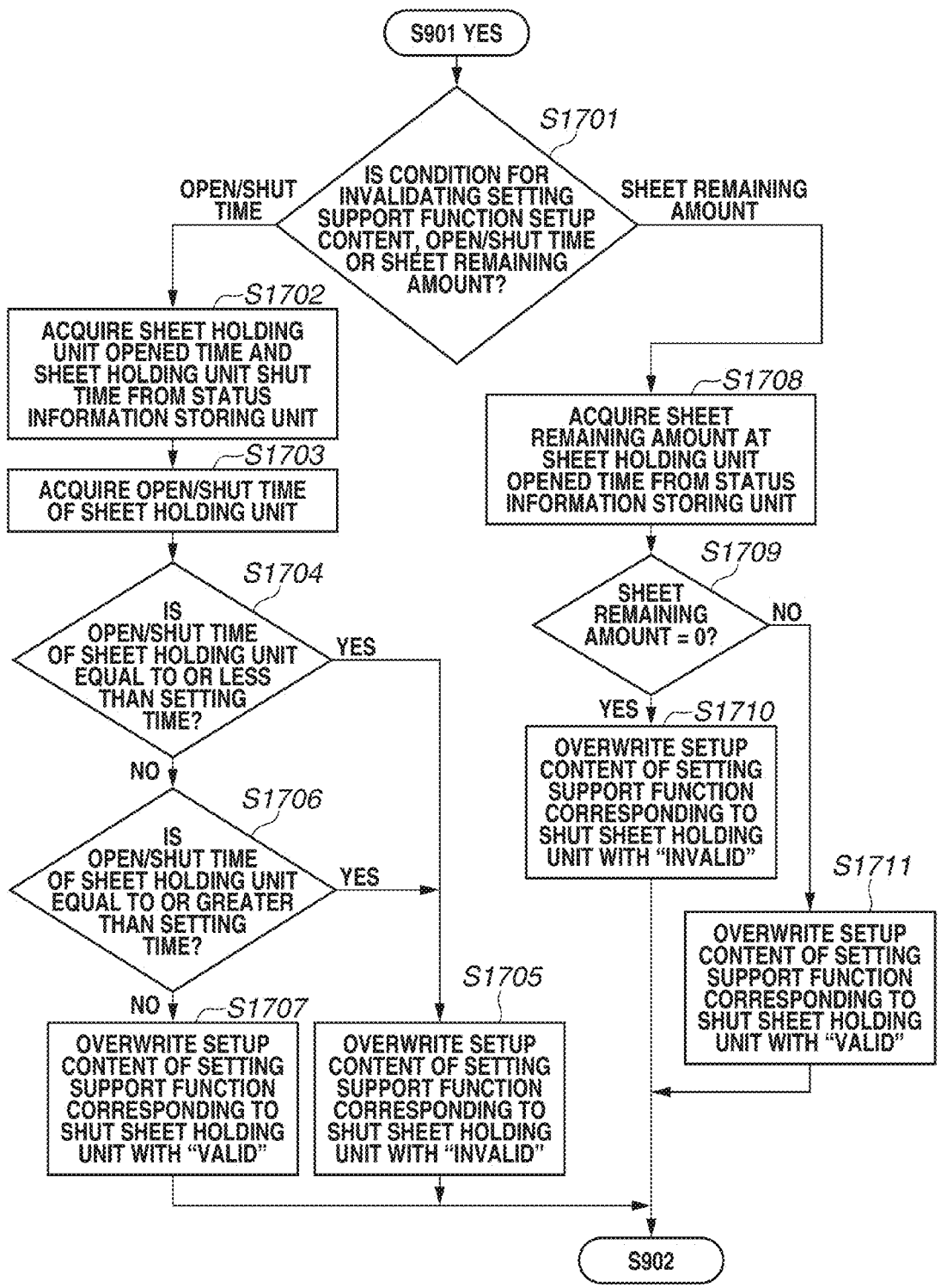

SETTING SUPPORT FUNCTION SETUP

DETERMINED SETUP CONDITION FOR INVALIDATING
SETTING SUPPORT FUNCTION IS AS FOLLOWS.

*1810*        *1811*

○ OPEN/SHUT TIME OF SHEET HOLDING      [ 5 ]   SECONDS
  UNIT IS EQUAL TO OR LESS THAN

*1812*
       EQUAL TO OR GREATER THAN        [ 10 ]  MINUTES

*1820*

◉ SHEET REMAINING AMOUNT AT SHEET HOLDING UNIT OPENED TIME IS

REMAINING AMOUNT = ZERO   [ CHANGE... ]  *1821*

[ OK ]   [ CANCEL ]

SETTING SUPPORT FUNCTION SETUP

SETTING SUPPORT FUNCTION IS INVALIDATED.

IF SHEET REMAINING AMOUNT AT SHEET
HOLDING UNIT OPENED TIME IS

*1831* — ○ REMAINING AMOUNT = ZERO

*1832* — ◉ REMAINING AMOUNT ≠ ZERO

[ OK ]   [ CANCEL ]

PRINTING AND PRINTING CONTROL INCLUDES DETERMINING WHETHER TO SET SHEET ATTRIBUTE INFORMATION OF SHEETS IN SHEET HOLDING UNITS

BACKGROUND OF THE INVENTION

1. Field of the Invention

The present invention relates to a printing system, a printing apparatus, a printing control apparatus, a sheet management system, a printing apparatus control method and related storage medium, and a printing control apparatus control method and related storage medium.

2. Description of the Related Art

When a sheet holding unit provided in a printing apparatus is used to perform a printing operation, storing sheet attribute information (e.g., sheet name, sheet size, sheet grammage, sheet surface nature, and sheet color) beforehand as sheet holding unit setting value is generally performed.

To store sheet attribute information as sheet holding unit setting value, it is required every time to input sheet attribute information for each sheet holding unit. Therefore, as discussed in Japanese Patent Application Laid-Open No. 2007-241425, it is conventionally known to register attribute information for each sheet beforehand in a sheet management database and let a user select desired sheet attribute information to be stored as sheet holding unit setting value.

According to the above-mentioned technique discussed in Japanese Patent Application Laid-Open No. 2007-241425, if the number of sheets registered in the sheet management database increases, it will take a significant time for a user to find out a desired sheet from the great number of registered sheets. Therefore, for example, in a case where a printing operation is performed with frequently used sheets stored in a sheet holding unit, setting attribute information about frequently used sheets as sheet holding unit setting value is a complicated work for each user.

On the other hand, in a case where a printing operation is performed with non-frequently used sheets (i.e., sheets not registered in the sheet management database) stored in a sheet holding unit, a user is required to operate an operation unit to set attribute information about the selected sheet as sheet holding unit setting value. However, the setting value having been set through a user operation may be undesirably changed.

SUMMARY OF THE INVENTION

According to an aspect of the present invention, a printing system includes a printing apparatus and a printing control apparatus to communicate with each other. The printing apparatus includes an obtaining unit configured to obtain first attribute information about a sheet stored in a sheet holding unit of the printing apparatus, and a first sending unit configured to send the first attribute information obtained by the obtaining unit to the printing control apparatus. The printing control apparatus includes a storing unit configured to store a combination of the first attribute information and second attribute information about a sheet, a first receiving unit configured to receive the first attribute information sent by the first sending unit, and a second sending unit configured to obtain the second attribute information stored in association with the first attribute information from the storing unit based on the first attribute information received by the first receiving unit, and configured to send the obtained second attribute information to the printing apparatus. The printing apparatus further includes a second receiving unit configured to receive the second attribute information sent by the second sending unit, a setting unit configured to set the second attribute information received by the second receiving unit as attribute information about the sheet stored in the sheet holding unit, and a control unit configured to cause the setting unit to set the second attribute information in a case where setting of the second attribute information by the setting unit is designated and configured to restrict the setting unit from setting the second attribute information in a case where the setting of the second attribute information by the setting unit is not designated.

Further features of the present invention will become apparent from the following description of exemplary embodiments with reference to the attached drawings.

BRIEF DESCRIPTION OF THE DRAWINGS

FIGS. 7A and 7B illustrate registration screens that can be displayed by the server according to the first exemplary embodiment to enable a user to register sheet attribute information in a sheet information storing unit.

FIG. 8A illustrates a registration screen that can be displayed by the server according to the first exemplary embodiment, which enables a user to register sheet attribute information in association with each sheet holding unit.

FIG. 8B illustrates an attribute table in which sheet attribute information is registered in association with each sheet holding unit.

FIG. 9 is a flowchart illustrating exemplary processing for setting sheet attribute information uniquely identified with reference to the sheet holding unit information storing unit as sheet holding unit setting value, which can be performed by the printing apparatus according to the first exemplary embodiment.

FIG. 10 is a flowchart illustrating exemplary processing for searching for a sheet registered in the sheet holding unit information storing unit, which can be performed by the server according to the first exemplary embodiment.

FIG. 11 is a flowchart illustrating exemplary processing for validating or invalidating setting support function for each sheet holding unit, which can be performed by the printing apparatus according to the first exemplary embodiment.

FIG. 16 illustrates a status table in which status information is registered for each sheet holding unit of a printing apparatus according to the third exemplary embodiment.

FIG. 17 is a flowchart illustrating exemplary processing for setting sheet attribute information uniquely identified with reference to the sheet holding unit information storing unit as sheet holding unit setting value, which can be performed by the printing apparatus according to the third exemplary embodiment.

FIGS. 18A and 18B illustrate setting support function setup screens of the printing apparatus according to the third exemplary embodiment.

DESCRIPTION OF THE EMBODIMENTS

Various exemplary embodiments, features, and aspects of the invention will be described in detail below with reference to the drawings.

Exemplary embodiments described below are not intended to narrowly limit the present invention. Further, it is not always required to include all of characteristic features combined in respective exemplary embodiments as solving means of the present invention.

<Digital Printing System>

Figure 1:
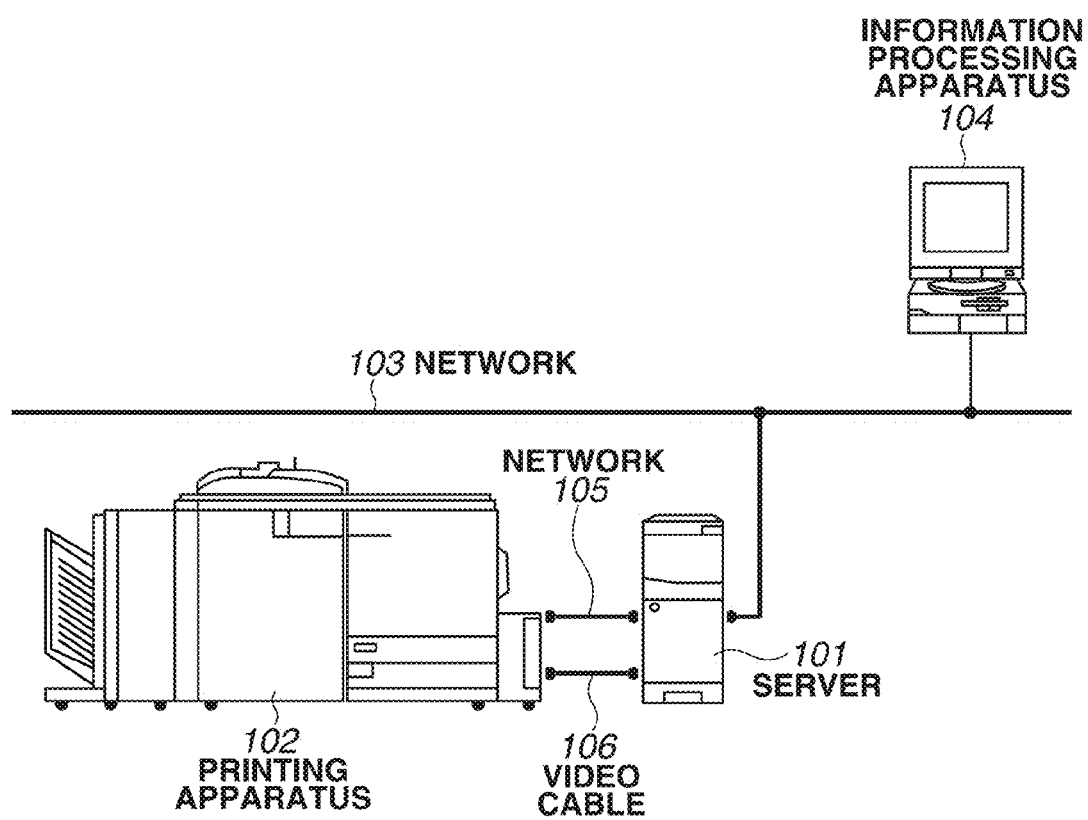
FIG. 1 illustrates a digital printing system according to a first exemplary embodiment of the present invention.

A digital printing system according to a first exemplary embodiment of the present invention is described in detail below with reference to FIG. 1.

A digital printing machine (i.e., a printing apparatus) 102 has various (e.g., scan, print, and copy) functions. A server 101 has various (e.g., image processing, print control, and job management) functions. An information processing apparatus (e.g., a computer) 104 has various (e.g., application file editing and print instruction) functions.

In the digital printing system, the printing apparatus 102 is connected to the server 101 via a network 105 and a video cable 106. Further, the server 101 can communicate with the information processing apparatus 104 via a network 103 (e.g., a local area network (LAN) or a wide area network (WAN)) or a wireless LAN. The video cable 106 can be used to transfer an image to be printed. The network 105 can be used to transmit and receive other information. Unless otherwise mentioned, the network that connects the printing apparatus 102 and the server 101 is LAN, WAN, or a comparable network as long as it can realize the functions of the present invention.

In the exemplary embodiment of the present invention, the information processing apparatus 104 can transmit and receive various types of data to and from the printing apparatus 102 via the server 101. Further, the server 101 can receive a print job from the information processing apparatus 104 via the network 103 and can transfer the received print job to the printing apparatus 102. Each user can use the information processing apparatus 104 to confirm the status of a job and operational states of the server 101 and the printing apparatus 102. Further, the user can operate the server 101 directly or remotely to store sheet attribute information, as sheet holding unit setting value of the printing apparatus 102, for example, in the printing apparatus (which may be also referred to as a sheet management system).

In a case where the information processing apparatus 104 is functionally operable as the server 101, the information processing apparatus 104 can be configured to directly transmit and receive data and commands to and from the printing apparatus 102. In such a case, the information processing apparatus 104 has a configuration similar to that of the server 101 except that the information processing apparatus 104 is connected to the printing apparatus 102 via the network 105 and the video cable 106.

<Configuration of Server>

Figure 2:
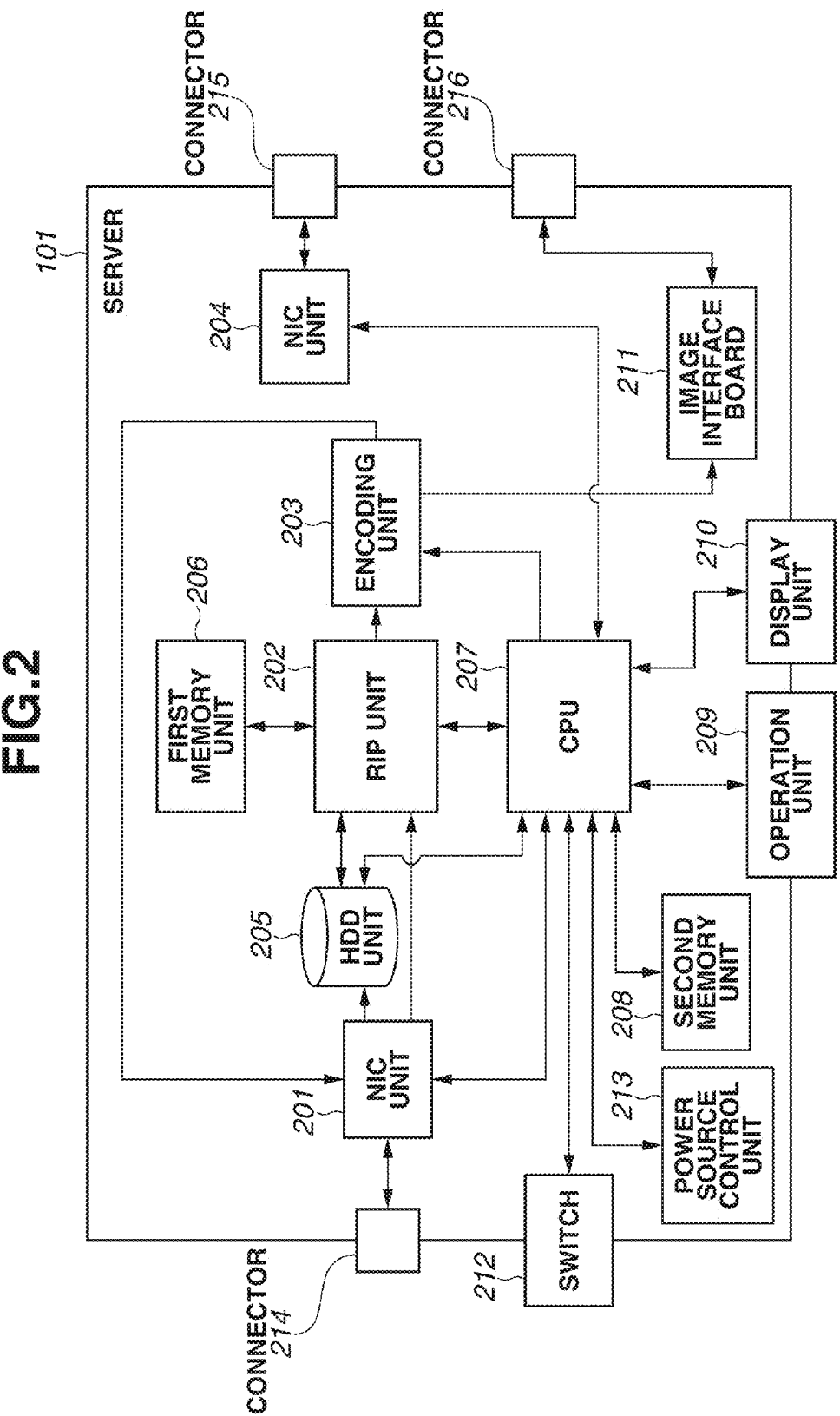
FIG. 2 is a block diagram illustrating a configuration of a server according to the first exemplary embodiment.

A configuration example of the server according to the first exemplary embodiment 101 of the present invention is described in detail below with reference to FIG. 2.

A network interface card (NIC) unit 201 is a first network interface that can control communications to be performed via the network 103. On the other hand, a NIC unit 204 is a second network interface that can control communication to be performed via the network 105. Each of the NIC unit 201 and the NIC unit 204 can control communications via a wireless LAN.

A raster image processing (RIP) unit 202 can perform processing for converting print language data, such as page description language (PDL) data received by the NIC unit 201, or a specific data format into a rasterized image.

An encoding unit 203 can perform processing for converting the rasterized image data into print data having a data format supported by the printing apparatus 102.

A hard disk drive (HDD) unit 205 can temporarily store (spool) the PDL data received by the NIC unit 201 or can temporarily store RIP processed compression data. Further, the HDD unit 205 can store system software applications for various processing described below in addition to data stored in a sheet information storing unit 401 illustrated in FIG. 4 and data stored in a sheet holding unit information storing unit 402 illustrated in FIG. 4. However, instead of using the HDD unit 205, the data stored in the sheet information storing unit 401 and the sheet holding unit information storing unit 402 can be stored in a nonvolatile memory, such as a solid state drive (SSD).

A central processing unit (CPU) 207 can control processing and operations to be performed by various units provided in the server 101. A first memory unit 206 is usable when the RIP unit 202 performs image rasterizing processing. On the other hand, the CPU 207 can use a second memory unit 208 as a temporary data storage area.

An operation unit 209 includes buttons, keys, and a touch panel to enable a user to operate the server 101. A display unit 210 can perform information presenting processing by displaying images and text data. An image interface board 211 and a connector 216 for the image interface board 211 are usable to create image data and transfer the created image data to a dedicated transmission path. A switch 212 is operable to input operational (e.g., power source startup and shutdown) instructions. When the switch 212 is operated, an interrupt signal is input to the CPU 207. The CPU 207 can control a power source control unit 213 according to an operational state in response to the interrupt signal.

A data packet, if it is transmitted from the information processing apparatus 104, can be input to the server 101 via the network 103 and a connector 214. In the server 101, the NIC unit 201 can perform data reception processing. The NIC unit 201 can perform processing for writing received data into the HDD unit 205 under control of the CPU 207, if it is necessary. The above-mentioned processing is referred to as queuing (spool), which is generally performed to improve the transfer speed of data. The RIP unit 202 can read the data stored in the HDD unit 205 according to an instruction from the CPU 207.

Subsequently, the encoding unit 203, which is functionally operable as a data format conversion unit, performs processing for encoding received data into a preliminarily set data format that can be interpreted by the printing apparatus 102 based on the data format that can be interpreted by the printing apparatus 102 and a format of received data. It is necessary that the encoded data has a format that can be interpreted by the printing apparatus 102.

The above-mentioned format is variable depending on the ability of a built-in interpretation unit of the printing apparatus 102. For example, the format is a specific print language format or a data format compressed according to a specific method (e.g., JBIG). The NIC unit 204 performs data packet processing again to transmit the encoded data to the network 105. The data packet can be output from the connector 215 and transmitted to the printing apparatus 102 via the network 105. It is useful to transmit the encoded data to the printing apparatus 102 via a local interface, such as a universal serial bus (USB).

When the printing apparatus 102 receives the data packet, the printing apparatus 102 performs print processing on a recording medium (e.g., a sheet) according to its own print processing procedure.

As another data transfer method, the data can be transferred to the image interface board 211 via the encoding unit 203 and then can be output via the connector 216. Further, the data can be transmitted to the printing apparatus 102 via the video cable 106. The method includes appropriately acquiring information about power source state and startup state (normal/abnormal) of the server 101 and the printing apparatus 102. The information processing apparatus 104 sends a data packet to the server 101 based on the acquired information about power source state and startup state.

The method includes periodically performing polling to acquire the information about power source state and startup state of the server 101 and the printing apparatus 102 at predetermined time intervals. The information processing apparatus 104 acquires a state change notification packet sent from the server 101 and the printing apparatus 102 and changes the processing content thereof. As an example, if the information processing apparatus 104 receives a power source shutdown notification packet from the printing apparatus 102, the polling can be interrupted in such a way as to prevent the network from being used uselessly.

<Configuration of Printing Apparatus>

A configuration example of the printing apparatus 102 according to the first exemplary embodiment of the present invention is described in detail below with reference to FIG. 3.

The printing apparatus 102 includes a plurality of sheet holding units 322. Each of the plurality of sheet holding units can be a sheet feeding tray or a manual tray. For example, the plurality of sheet holding units 322 can be constituted by a combination of sheet feeding trays and a manual tray. Each sheet holding unit 322 includes a size detection sensor 325 that can detect the size of sheets stored in the sheet holding unit and an open/shut detection sensor 326 that can detect an open/shut operation for the sheet holding unit. The size of sheets stored in the sheet holding unit can be acquired by accepting a user operation via the operation unit 318 of the printing apparatus 102. Alternatively, the size of sheets stored in the shut sheet holding unit can be imported from an external apparatus (e.g., the information processing apparatus 104).

The printing apparatus 102 can further include a sensor capable of detecting the remaining amount of sheets stored in each sheet holding unit 322 and a sensor capable of detecting characteristics (e.g., color and surface nature) of sheets stored in each sheet holding unit 322. Alternatively, the characteristics (e.g., color and surface nature) of sheets stored in each sheet holding unit 322 can be acquired by accepting a user operation via the operation unit 318 of the printing apparatus 102 or can be imported from an external apparatus (e.g., the information processing apparatus 104).

The printing apparatus 102 is connected to a scanner 320 (i.e., an image input device) and a printer engine 301 (i.e., an image output device). The printing apparatus 102 can control image data reading and printing operations. Further, the printing apparatus 102 can perform control to input and output image information and device information via the network or the video cable, in a state where the printing apparatus 102 is connected to the network, the video cable, or a telephone line.

A central processing unit (CPU) 302 can control various operations to be performed by the printing apparatus 102. A random access memory (RAM) 303 is functionally operable as a system work memory for the CPU 302 or an image memory that temporarily stores input image data. Further, a read only memory (ROM) 307 is a boot ROM that stores a system boot program. A hard disk drive (HDD) 308 can store system software applications and input image data that are necessary to perform various processing described below. Further, the HDD 308 can store setting information input via the operation unit 318, setting information received from the server 101, and attribute information (e.g., size) of sheets stored in the sheet holding unit 322 or the manual tray 327. However, instead of using the HDD 308, it is useful to store the system software applications and input image data required to perform various processing in a nonvolatile memory, such as an SSD.

An operation unit I/F 304 is an interface unit configured to output operation screen data to the operation unit 318 that has an image data display screen. Further, the operation unit I/F 304 is functionally operable to transmit information, if input by a user via the operation unit 318, to the CPU 302. The operation unit 318 includes a touch panel unit and a key input unit although not illustrated. The operation unit 318 provides various interfaces that are usable to perform various settings and operations for the printing apparatus 102 according to the first exemplary embodiment.

A network I/F 305 can perform information input/output processing with an external apparatus via a network. The network I/F 305 can be realized, for example, by a LAN card. Alternatively, a wireless LAN is usable to perform the information input/output processing between the printing apparatus 102 and the external apparatus, if a wired network (e.g., LAN or WAN) is unavailable. A modem 306 can perform information input/output processing with an external apparatus via the telephone line. A video I/F 324 can perform information input/output processing with an external apparatus via the video cable.

The above-mentioned functional units are mutually connected via a system bus 323.

An image bus I/F 309 is an interface that connects the system bus 323 to an image bus 319 and operates as a bus bridge having a data structure conversion capability. The image bus 319 can speedily transfer image data. A raster image processor (RIP) 311, a device I/F 312, a scanner image processing unit 313, a printer image processing unit 314, and an image editing processing unit 315 are connected to each other via the image bus 319.

The RIP 311 is a raster image processor that can rasterize a page description language (PDL) as a raster image. The device I/F 312 can transfer image data, if it is input from the scanner 320, to the HDD 308. Further, the device I/F 312 can transfer image data to the printer engine 301. However, instead of using the device I/F 312, it can be configured to transfer image data, if it is input from the scanner 320, to the HDD 308 according to an instruction from the CPU 302. Similarly, instead of using the device I/F 312, it can be configured to transfer the image data to the printer engine 301 according to an instruction from the CPU 302.

The scanner image processing unit 313 can perform various (including correction) processing on image data, if it is input from the scanner 320. The printer image processing unit 314 can perform various (e.g., correction and resolution conversion) processing on image data to be printed out with reference to the capabilities of the printer engine 301. The image editing processing unit 315 can perform various (e.g., rotation and compression/decompression) image processing on image data.

A switch 317 is operable to input operational (e.g., power source startup and shutdown) instructions. When the switch 317 is operated, a power source control unit 316 transmits an interrupt signal to the CPU 302. The CPU 302 controls the power source control unit 316 according to an operational state in response to the interrupt signal.

A sheet holding unit control unit 321 is a module that can store sheet attribute information as a setting value for the sheet holding unit 322 of the printing apparatus (which may be also referred to as a sheet management system) and can control a sheet feeding operation. The printing apparatus 102 can control a printing operation based on the sheet attribute information stored as the setting value for the sheet holding unit. The sheet attribute information includes, for example, sheet size, sheet grammage, sheet color, and sheet type.

For example, the printing apparatus 102 determines an appropriate sheet holding unit 322 to be used in a printing operation based on the size of sheets to be used for a print job and controls the determined sheet holding unit 322 to perform a sheet feeding operation. Further, the printing apparatus 102 controls sheet conveyance speed or fixing device temperature based on sheet grammage or sheet type. The sheet holding unit control unit 321 acquires information relating to the open/shut operation of the sheet holding unit 322 from the open/shut detection sensor 326 and detects whether a sheet holding unit 322 being in an opened state has been shut.

Figure 4:
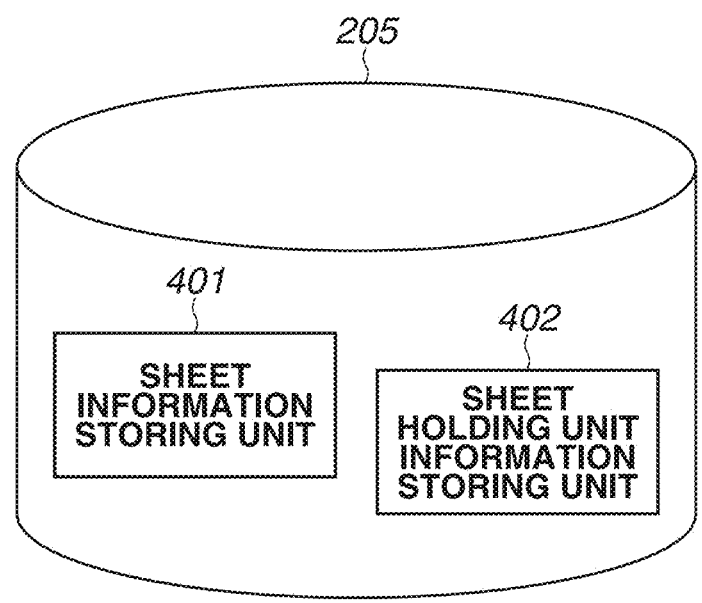
FIG. 4 illustrates data stored in an HDD unit of the server according to the first exemplary embodiment.

In the exemplary embodiment of the present invention, the sheet information storing unit 401 and the sheet holding unit information storing unit 402 are stored as independent storage areas in the HDD unit 205 of the server 101 as illustrated in FIG. 4. As another exemplary embodiment, it may be useful to provide comparable storage areas in the HDD 308 of the printing apparatus 102, instead of using the HDD unit 205 of the server 101. Further, it is useful to provide comparable storage areas in a nonvolatile memory (not illustrated) of the information processing apparatus 104. In such a case, the data stored in the sheet information storing unit 401 and the sheet holding unit information storing unit 402 can be referred to via the network 103.

The sheet information storing unit 401 can store sheet attribute information registered by a user, as an attribute table 702 having a list format as illustrated in FIG. 7A. The sheet attribute information registered in the sheet information storing unit 401 includes, for example, ID, sheet name, sheet size, sheet grammage, sheet color, and sheet type. Further, for example, registration target sheets in the sheet information storing unit 401 include printer maker evaluated sheets and user-definition sheets customized by a user based on standard sheets and evaluated sheets, in addition to ordinarily used sheets. Exemplary processing for registering sheet attribute information in the sheet information storing unit 401 is described in detail below with reference to FIG. 5.

On the other hand, the sheet holding unit information storing unit 402 can store sheet attribute information, as an attribute table 810 having a list format as illustrated in FIG. 8B, in which each sheet having been arbitrarily selected by a user from the sheets registered in the sheet information storing unit 401 is associated with a sheet holding unit. Exemplary processing for registering sheet attribute information in association with a sheet holding unit in the sheet holding unit information storing unit 402 is described in detail below with reference to FIG. 6.

First, exemplary processing for registering sheet attribute information in the sheet information storing unit 401 is described in detail below with reference to a flowchart illustrated in FIG. 5. To attain the processing of the flowcharts illustrated in FIGS. 5, 6, and 10, the CPU 207 of the server 101 executes a program loaded from the HDD unit 205 and developed into the second memory unit 208. Although in the exemplary embodiment of the present invention the server 101 performs the processing for registering sheet attribute information in the sheet information storing unit 401, the printing apparatus 102 can perform similar processing. When the printing apparatus 102 performs the above-mentioned processing, the CPU 302 executes a program loaded from the HDD 308 and developed into the RAM 303. On the other hand, in a case where the information processing apparatus 104 is functionally operable as the server 101, the information processing apparatus 104 can perform similar processing.

First, in step S501, the CPU 207 determines whether a registration screen 700 illustrated in FIG. 7A has been called. The registration screen 700 illustrated in FIG. 7A can be displayed on the operation unit 209 of the server 101. The sheet attribute information includes, for example, ID, sheet name, sheet size, sheet grammage, sheet color, and sheet type. The sheet attribute information can be registered in a list format on the registration screen 700.

If the CPU 207 determines that the registration screen 700 has been called (YES in step S501), the operation proceeds to step S502. Otherwise, the CPU 207 repeats the processing in step S501 until the registration screen 700 is called.

In step S502, the CPU 207 displays the registration screen 700 on the operation unit 209 of the server 101 to accept each pressing of the addition button 701 on the registration screen 700. Subsequently, the operation proceeds to step S503.

In step S503, the CPU 207 displays an addition screen 710 illustrated in FIG. 7B on the operation unit 209 of the server 101. The CPU 207 acquires sheet attribute information (e.g., sheet name, size, grammage, color, and type) input by a user. Then, the operation proceeds to step S504. The attribute information (e.g., sheet name, size, grammage, color, and type) can be imported from an external apparatus, such as the information processing apparatus 104 or the printing apparatus 102.

In step S504, the CPU 207 determines whether a registration button 711 has been pressed on the addition screen 710 illustrated in FIG. 7B. If the CPU 207 determines that the registration button 711 has been pressed (YES in step S504), the operation proceeds to step S505. Otherwise, the CPU 207 repeats the processing in step S504 until the registration button 711 is pressed.

In step S505, the CPU 207 registers the sheet attribute information acquired in step S503 in the sheet information storing unit 401 of the HDD unit 205 provided in the server 101. Then, after completing the processing in step S505, the CPU 207 terminates line of processing for registering the sheet attribute information in the sheet information storing unit 401.

As mentioned above, the server 101 performs the line of processing for registering the sheet attribute information in the sheet information storing unit 401. The printing apparatus 102 can perform processing similar to the above-mentioned registration processing performed by the server 101. More specifically, in performing the above-mentioned registration processing, "the CPU 302", "the operation unit 318", and "the HDD 308" of the printing apparatus 102 are functionally comparable to "the CPU 207", "the operation unit 209", and "the HDD unit 205" of the server 101.

Next, exemplary processing for registering sheet attribute information in the sheet holding unit information storing unit 402 in association with a sheet holding unit is described in detail below with reference to a flowchart illustrated in FIG. 6. First, in step S601, the CPU 207 determines whether a registration screen 800 illustrated in FIG. 8A has been called. The registration screen 800 can be displayed on the operation unit 209 of the server 101.

If the CPU 207 determines that the registration screen 800 has been called (YES in step S601), the operation proceeds to step S602. Otherwise, the CPU 207 repeats the processing in step S601 until the registration screen 800 is called.

In step S602, the CPU 207 displays the registration screen 800 on the operation unit 209 of the server 101. The operation proceeds to step S603.

In step S603, the CPU 207 determines whether there is any sheet holding unit having been selected on the operation unit 209 of the server 101. If the CPU 207 determines that there is a selected sheet holding unit (YES in step S603), the operation proceeds to step S604. Otherwise, the CPU 207 repeats the processing in step S603 until a sheet holding unit is selected.

In step S604, the CPU 207 refers to the sheet attribute information registered in the sheet information storing unit 401 and acquires attribute information about a sheet arbitrarily selected from the sheets registered in the sheet information storing unit 401. Then, the operation proceeds to step S605. The sheet information storing unit 401 is provided in the HDD unit 205 of the server 101. The sheet attribute information acquired in step S604 is a combination including at least one of sheet size, sheet grammage, sheet color, and sheet type. After the sheet attribute information is acquired in step S604, a part of the acquired attribute information (e.g., sheet size, grammage, color, or type) can be changed if desired. The attribute information (e.g., sheet size, grammage, color, and type) can be imported from an external apparatus, such as the information processing apparatus 104 or the printing apparatus 102.

In step S605, the CPU 207 determines whether a sheet having the same size as the sheet having been arbitrarily selected in step S604 is already registered in association with the sheet holding unit having been selected in step S603. In the present exemplary embodiment, the sheet holding unit information storing unit 402 is configured to prevent a plurality of sheets having the same size from being registered in association with the same sheet holding unit. Because only one sheet size can be registered in association with each sheet holding unit, it is feasible to uniquely identify sheet attribute information to be set as sheet holding unit setting value based on the size of sheets stored in the sheet holding unit.

The sheet attribute information being set as sheet holding unit setting value is a sheet holding unit setting value provisionally stored in the HDD 308. Then, a user can perform an operation to fix the sheet holding unit setting value on the operation unit 318 of the printing apparatus 102. The fixed sheet holding unit setting value can be stored in the HDD 308.

The attribute table 810 illustrated in FIG. 8B is described in detail below. The attribute table 810 includes sheet attribute information (e.g., sheet name, size, grammage, color, and type) registered on the registration screen 800 in a list format in association with each sheet holding unit. For example, a sheet having sheet attribute information "name: A corporation Media1, size: A4, grammage: 62 g/m$^2$, color: White, and type: plain paper" is registered in association with sheet holding unit "Tray1." Therefore, a sheet having sheet attribute information "name: A corporation Media2, size: A4, grammage: 80 g/m$^2$, color: Yellow, and type: plain paper" cannot be additionally registered in association with the sheet holding unit "Tray1."

In the present exemplary embodiment, the size detection sensor 325 equipped in each sheet holding unit can detect the size of each sheet. Therefore, as mentioned above, the sheet holding unit information storing unit 402 is configured to prevent a plurality of sheets having the same size from being registered in association with the same sheet holding unit. Even in a case where the size detection sensor 325 is not provided in each sheet holding unit, similar restrictive processing is feasible if the size of each sheet stored in the sheet holding unit can be acquired.

On the other hand, if the sheet color, grammage, or type is detectable by the sensor provided in each sheet holding unit, similar restrictive processing is feasible referring to the sheet color, grammage, or type instead of referring to the sheet size. Alternatively, similar restrictive processing is feasible if the color, grammage, or type of sheets stored in each sheet holding unit can be acquired by any other device. More specifically, the sheet holding unit information storing unit 402 can be configured to prevent a plurality of sheets having the same color, grammage, or type from being registered in association with one sheet holding unit.

If the CPU 207 determines that the sheet having the same size is not registered (NO in step S605), the operation proceeds to step S606. On the other hand, if the CPU 207 determines that the sheet having the same size is already registered (YES in step S605), the CPU 207 terminates the above-mentioned line of processing for registering the sheet attribute information in association with the sheet holding unit.

When the sheet having the same size is already registered, it is useful to display a warning screen (not illustrated) on the operation unit 209 of the server 101 before terminating the above-mentioned line of processing. For example, the warning screen notifies the presence of a sheet having the same size as the sheet selected by the user that is already registered in association with the sheet holding unit.

In step S606, the CPU 207 registers the attribute information about the sheet having been arbitrarily selected in step S604 in the sheet holding unit information storing unit 402 of the HDD unit 205 in association with the sheet holding unit having been selected in step S603. For example, as understood from the attribute table 810 illustrated in FIG. 8B, the sheet having sheet attribute information "name: A corporation Media1, size: A4, grammage: 62 g/m$^2$, color: White, and type: plain paper" is registered in association with sheet holding units "Tray1" and "Tray4." As mentioned above, in the sheet holding unit information storing unit 402, it is feasible to register the same sheet in association with a plurality of sheet holding units.

Then, after completing the processing in step S606, the CPU 207 terminates the above-mentioned line of processing for registering the sheet attribute information in association with the sheet holding unit.

As mentioned above, the server 101 can perform line of processing for registering the sheet attribute information in the sheet holding unit information storing unit 402 in association with the sheet holding unit. The printing apparatus 102 can perform processing similar to the above-mentioned registration processing performed by the server 101. More specifically, in performing the above-mentioned registration processing, "the CPU 302", "the operation unit 318", and "the HDD 308" of the printing apparatus 102 are functionally comparable to "the CPU 207", "the operation unit 209", and "the HDD unit 205" of the server 101.

In the first exemplary embodiment, the setting of the sheet holding unit setting value is performed by acquiring sheet attribute information uniquely identified with reference to the sheet holding unit information storing unit 402 provided in the HDD unit 205 of the server 101. The line of processing for supporting the setting of sheet holding unit setting values of the printing apparatus (which may be also referred to as sheet management system) as mentioned above is hereinafter referred to as "setting support function."

Figure 12A:
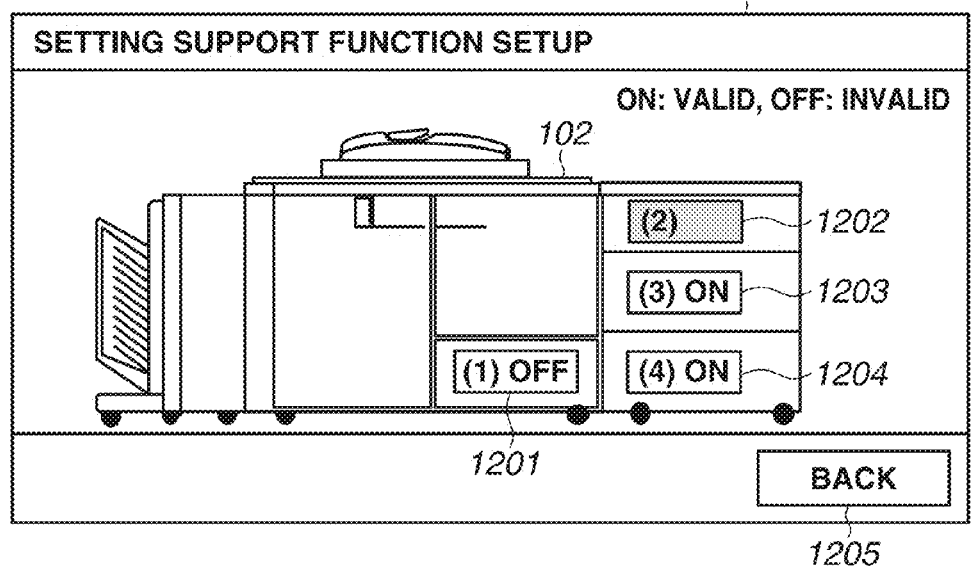
FIGS. 12A and 12B illustrate setting support function selection screens according to the first exemplary embodiment.
Figure 12B:
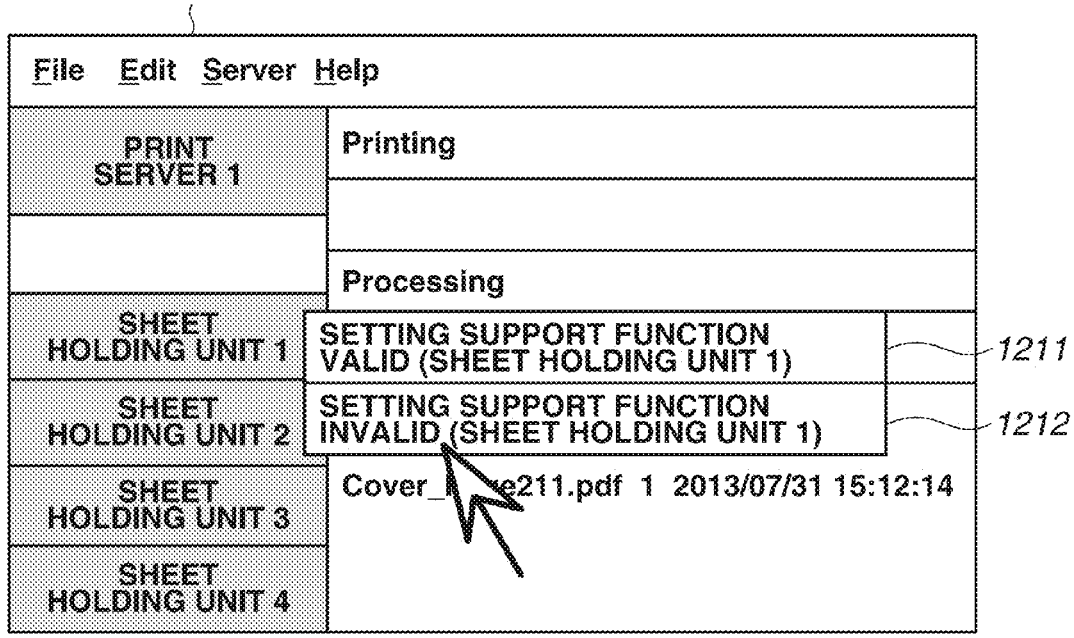

In the first exemplary embodiment, a user can preliminarily select settings using setup screens illustrated in FIGS. 12A and 12B to determine whether to validate or invalidate the setting support function for each sheet holding unit. Then, the setting support function setup result (valid or invalid) is stored in the HDD 308 of the printing apparatus 102 or in the HDD unit 205 of the server 101.

Switching over the operation to set the sheet holding unit setting value for each sheet holding unit, according to the selection with respect to the setting result (valid or invalid) of the setting support function for each sheet holding unit is described in detail below. In the following description of the operation (configuration) according to the first exemplary embodiment, it is presumed that the attribute table 810 illustrated in FIG. 8B is already registered in the sheet holding unit information storing unit 402.

Sequential processing for setting sheet attribute information uniquely identified with reference to the sheet holding unit information storing unit 402, as sheet holding unit setting value, which can be performed by the printing apparatus 102 according to the first exemplary embodiment, is described in detail below with reference to a flowchart illustrated in FIG. 9. To attain the above-mentioned processing, the CPU 302 of the printing apparatus 102 executes a program loaded from the HDD 308 and developed into the RAM 303.

First, in step S901, the CPU 302 determines whether a sheet holding unit being in an opened state has been shut. In this case, it is presumed that a user opens a sheet holding unit to store sheets necessary to execute a job and the opened-state sheet holding unit is shut after the storage of sheets is completed. For example, information from the open/shut detection sensor 326 illustrated in FIG. 3 is available when the CPU 302 determines whether the opened-state sheet holding unit has been shut.

If the CPU 302 determines that the sheet holding unit has been shut (YES in step S901), the operation proceeds to step S902. Otherwise, the CPU 302 repeats the processing in step S901 until the sheet holding unit is shut.

Figure 3:
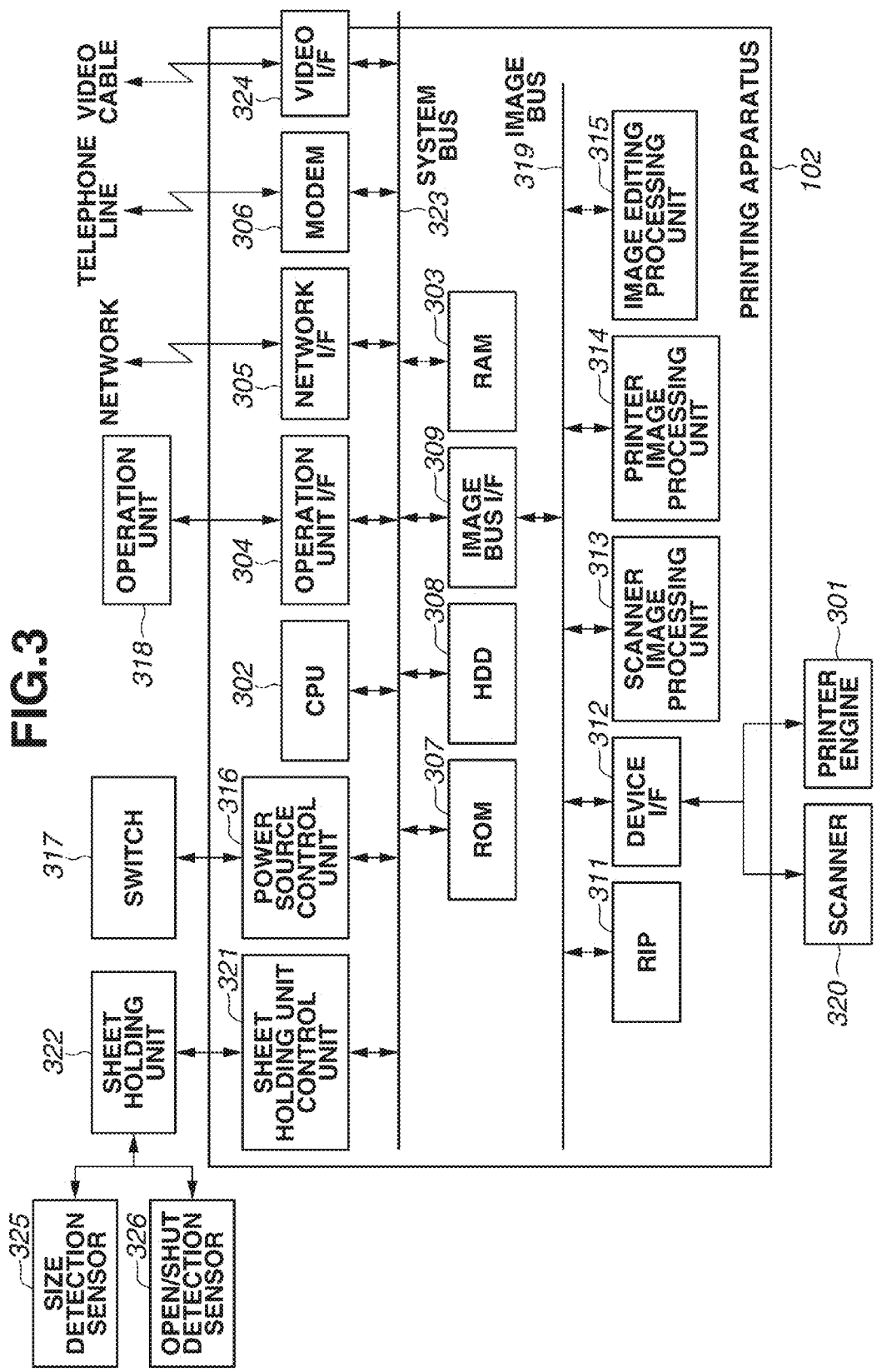
FIG. 3 is a block diagram illustrating a configuration of a printing apparatus according to the first exemplary embodiment.

In step S902, the CPU 302 causes the size detection sensor 325 illustrated in FIG. 3 to detect the size of sheets stored in the shut sheet holding unit. Then, the operation proceeds to step S903. For example, the size of sheets stored in the shut sheet holding unit can be acquired by accepting a user operation via the operation unit 318 of the printing apparatus 102. Alternatively, the size of sheets stored in the shut sheet holding unit can be imported from an external apparatus (e.g., the information processing apparatus 104).

In step S903, the CPU 302 transmits information required to identify the shut sheet holding unit (e.g., a serial number allocated to each sheet holding unit) and the sheet size detected (or acquired) in step S902 to the server 101 via the network 105. Then, the operation proceeds to step S904. The information required to identify the shut sheet holding unit is information required to identify a search target sheet holding unit in searching for a sheet registered in association with the sheet holding unit in the sheet holding unit information storing unit 402. Further, the size of sheets stored in the sheet holding unit is information required to uniquely identify a sheet from the sheets registered in association with the search target sheet holding unit. The information to be transmitted by the printing apparatus 102 in step S903 can be received by the server 101 in step S1001 illustrated in FIG. 10 as described below.

In step S904, the CPU 302 determines whether there is any response returned from the server 101 via the network 105 after transmitting the information required to identify the shut sheet holding unit and the detected (acquired) sheet size to the server 101. If the CPU 302 determines that there is a response (YES in step S904), the operation proceeds to step S905. Otherwise, the CPU 302 repeats the processing in step S904 until a response is received. If a predetermined time has elapsed without receiving any response from the server 101, the CPU 302 can perform time-out processing. Namely, the CPU 302 does not set any specific sheet attribute information as shut sheet holding unit setting value.

In this case, the CPU 302 can notify a user of the time-out result by displaying an appropriate indication or message on the operation unit 318 of the printing apparatus 102. Further, in response to the time-out result, it is useful to let a user operate the operation unit 318 of the printing apparatus 102 to input arbitrary sheet attribute information that can be set as shut sheet holding unit setting value. Alternatively, it is useful to acquire and set default sheet attribute information (e.g., "size: A4, grammage: 70 g/m$^2$, color: White, and type: plain paper") as shut sheet holding unit setting value.

The information received by the printing apparatus 102 in step S904 can be transmitted by the server 101 in step S1005 illustrated in FIG. 10.

In step S905, the CPU 302 determines whether sheet attribute information (e.g., sheet size, grammage, color, and type) has been received from the server 101 via the network 105. If the CPU 302 determines that the sheet attribute information has been received (YES in step S905), the operation proceeds to step S906. On the other hand, if the determination result in step S905 is NO, the CPU 302 terminates the processing for setting the sheet attribute information uniquely identified with reference to the sheet holding unit information storing unit 402 as sheet holding unit setting value. In this case, the CPU 302 can notify a user of the above-mentioned processing result terminated without receiving any sheet attribute information from the server 101, by displaying an appropriate indication or message on the operation unit 318 of the printing apparatus 102.

Further, in a case where no sheet attribute information is received from the server 101, it is useful to let a user operate the operation unit 318 of the printing apparatus 102 to input arbitrary sheet attribute information that can be set as shut sheet holding unit setting value. Alternatively, it is useful to acquire and set default sheet attribute information as shut sheet holding unit setting value. The information received by the printing apparatus 102 in step S905 can be transmitted by the server 101 in step S1004 illustrated in FIG. 10.

In step S906, the CPU 302 determines whether the setup content of the setting support function corresponding to the shut sheet holding unit is valid or invalid. Exemplary processing for setting the content (i.e., valid or invalid) of the setting support function for each sheet holding unit is described in detail below with reference to a flowchart illustrated in FIG. 11. Further, setting support function setup screens are described in detail below with reference to FIGS. 12A and 12B.

If in step S906 the CPU 302 determines that the setup content of the setting support function corresponding to the shut sheet holding unit is valid, the operation proceeds to step S907. On the other hand, if it is determined that the setup content of the setting support function is invalid, the CPU 302 terminates the processing for setting the sheet attribute information uniquely identified with reference to the sheet holding unit information storing unit 402 as sheet holding unit setting value.

In this case, the CPU 302 can display an appropriate indication or message on the operation unit 318 of the printing apparatus 102 to notify a user of the above-mentioned result of the processing that has been terminated because the setup content of the setting support function corresponding to the shut sheet holding unit is invalid. Further, in a case where the setup content of the setting support function corresponding to the shut sheet holding unit is invalid, it is useful to acquire and set arbitrary sheet attribute information as shut sheet holding unit setting value by accepting a user operation via the operation unit 318 of the printing apparatus 102. Alternatively, it is useful to acquire and set default sheet attribute information as shut sheet holding unit setting value.

In step S907, the CPU 302 sets the sheet attribute information received from the server 101 in step S905 as shut sheet holding unit setting value. The sheet attribute information to be set as sheet holding unit setting value in step S907 is provisionally stored in the HDD 308 as sheet holding unit setting value. Therefore, if the sheet attribute information having been set as sheet holding unit setting value is not desirable for a user, it is useful to change the sheet attribute information to be set as sheet holding unit setting value by accepting a user operation via the operation unit 318 of the printing apparatus 102. The user can perform an operation to fix the sheet holding unit setting value on the operation unit 318 of the printing apparatus 102. The fixed setting value of a sheet holding unit can be stored in the HDD 308.

After completing the processing in step S907, the CPU 302 terminates the processing for setting the sheet attribute information uniquely identified with reference to the sheet holding unit information storing unit 402 as sheet holding unit setting value.

As mentioned above, the printing apparatus 102 according to the first exemplary embodiment can perform the line of processing for setting specific sheet attribute information as a setting value of a shut sheet holding unit. As described above, the printing apparatus 102 detects (acquires) the size of sheets stored in the shut sheet holding unit in response to a shutting operation of the sheet holding unit, and transmits the detected (acquired) sheet size to the server 101, and further performs the subsequent processing. However, the operation to be performed by the printing apparatus 102 is not limited to the above-mentioned example.

However, if it is feasible to acquire the size of each sheet stored in a sheet holding unit in a state where the sheet holding unit is opened, it is useful to transmit the acquired sheet size to the server 101 in response to the elapse of a predetermined time since the opening of the sheet holding unit before performing the subsequent processing.

Alternatively, the operation unit 318 of the printing apparatus 102 can be configured to include a button that enables a user to transmit the size of sheets stored in the sheet holding unit to the server 101. In this case, the printing apparatus 102 can transmit the sheet size to the server 101 in response to each pressing of the above-mentioned button before performing the subsequent processing.

Next, line of processing for searching for a sheet registered in the sheet holding unit information storing unit 402 that can be performed by the server according to the first exemplary embodiment 101 is described in detail below with reference to a flowchart illustrated in FIG. 10.

First, in step S1001, the CPU 207 receives the information required to identify the shut sheet holding unit and the detected sheet size from the printing apparatus 102 via the network 105. Then, the operation proceeds to step S1002. The information received by the server 101 in step S1001 can be transmitted to the printing apparatus 102 in step S903 illustrated in FIG. 9.

In step S1002, the CPU 207 acquires information relating to each sheet registered in association with the shut sheet holding unit, from the sheet holding unit information storing unit 402 provided in the HDD unit 205 of the server 101, based on the information received in step S1001 (i.e., the information required to identify the shut sheet holding unit). Then, the CPU 207 determines whether there is at least one sheet registered in association with the shut sheet holding unit. If the CPU 207 determines that there is at least one sheet (YES in step S1002), the operation proceeds to step S1003. On the other hand, if the determination result in step S1002 is NO, the operation of the CPU 207 proceeds to step S1005. In this case, the CPU 207 can transmit a response to the printing apparatus 102 via the network 105 to inform the non-presence of any sheet registered in association with the shut sheet holding unit.

In step S1003, the CPU 207 determines whether there is any sheet having the same size as the sheets stored in the shut sheet holding unit based on the sheet size received in step S1001, in the sheet holding unit information storing unit 402 registered in association with the shut sheet holding unit. If the CPU 207 determines that the above-mentioned sheet is registered (YES in step S1003), the operation proceeds to step S1004. On the other hand, if the determination result in step S1003 is NO, the operation of the CPU 207 proceeds to step S1005. In this case, the CPU 207 can transmit a response to the printing apparatus 102 via the network 105 to inform the non-registration of any sheet having the same size as the sheets stored in the shut sheet holding unit.

In step S1004, the CPU 207 transmits sheet attribute information including the size of sheets stored in the shut sheet holding unit, from the sheet holding unit information storing unit 402 registered in association with the shut sheet holding unit, to the printing apparatus 102 via the network 105. The information to be transmitted by the server 101 in step S1004 can be received by the printing apparatus 102 in step S905 illustrated in FIG. 9.

After completing the processing in step S1004, the operation proceeds to step S1005. The CPU 207 transmits a response informing the completion of the processing by the server 101 to the printing apparatus 102 via the network 105. The information to be transmitted by the server 101 in step S1005 can be received by the printing apparatus 102 in step S904 illustrated in FIG. 9. After completing the processing in step S1005, the CPU 207 terminates the processing for searching for any sheet registered in the sheet holding unit information storing unit 402.

As mentioned above, the server 101 according to the first exemplary embodiment can perform the line of processing for searching for any sheet registered in the sheet holding unit information storing unit 402 provided in the HDD unit 205 of the server 101. The printing apparatus 102 can perform processing similar to the above-mentioned processing performed by the server 101. More specifically, in performing the above-mentioned processing, "the CPU 302" and "the HDD 308" of the printing apparatus 102 are functionally comparable to "the CPU 207" and "the HDD unit 205" of the server 101.

Next, line of processing for setting the setting support function to be valid or invalid for each sheet holding unit that can be performed by the printing apparatus 102 according to the first exemplary embodiment is described in detail below with reference to the flowchart illustrated in FIG. 11. To attain the above-mentioned processing, the CPU 302 of the printing apparatus 102 executes a program loaded from the HDD 308 and developed into the RAM 303.

Although in the first exemplary embodiment the printing apparatus 102 performs the processing for setting the setting support function to be valid or invalid for each sheet holding unit, the server 101 can perform similar processing. To attain the above-mentioned processing, the CPU 207 of the server 101 can execute a program loaded from the HDD unit 205 and developed into the second memory unit 208. On the other hand, in a case where the information processing apparatus 104 is functionally operable as the server 101, the information processing apparatus 104 can perform similar processing.

In step S1101, the CPU 302 determines whether a setup screen 1200 illustrated in FIG. 12A has been called. The setup screen 1200 is usable to set the setting support function to be valid or invalid for each sheet holding unit. If the CPU 302 determines that the setup screen 1200 has been called (YES in step S1101), the operation proceeds to step S1102. Otherwise, the CPU 302 repeats the processing in step S1101 until the setup screen 1200 is called.

In step S1102, the CPU 302 displays the setting support function setup screen 1200 on the operation unit 318 of the printing apparatus 102. Then, the operation proceeds to step S1103. For example, in a case where the printing apparatus 102 includes four sheet holding units, a button 1201 corresponding to a sheet holding unit 1, a button 1202 corresponding to a sheet holding unit 2, a button 1203 corresponding to a sheet holding unit 3, and a button 1204 corresponding to a sheet holding unit 4 are displayed on the setup screen 1200 so that each button can be pressed. Further, a "Back" button 1205 is displayed on the setup screen 1200. An event occurs in response to a pressing of each button.

In step S1103, the CPU 302 determines whether there is any event having occurred on the setting support function setup screen 1200. If the CPU 302 determines that an event has occurred (YES in step S1103), the operation proceeds to step S1104. Otherwise, the CPU 302 repeats the processing in step S1103 until an event occurs.

In step S1104, the CPU 302 determines whether the occurrence event identified in step S1103 is an event of pressing the "Back" button 1205. If the CPU 302 determines that the identified occurrence event is the event of pressing the "Back" button 1205 (YES in step S1104), the CPU 302 terminates the processing for validating or invalidating the setting support function for each sheet holding unit. On the other hand, if the determination result in step S1104 is NO, the operation of the CPU 302 proceeds to step S1105.

In step S1105, the CPU 302 determines whether the occurrence event identified in step S1103 is an event of pressing the sheet holding unit button (1201 to 1204). If the CPU 302 determines that the identified occurrence event is the event of pressing the sheet holding unit button (1201 to 1204) (YES in step S1105), the operation proceeds to step S1106. On the other hand, if the determination result in step S1105 is NO, the operation returns to step S1103 and the CPU 302 performs the above-mentioned processing again.

In step S1106, the CPU 302 refers to the setting support function setup result stored in the HDD 308 of the printing apparatus 102 and determines whether the setup content of the setting support function corresponding to the sheet holding unit whose button has been determined as being pressed in step S1105 is valid or invalid. If in step S1106 the CPU 302 determines that the setting is valid, the operation proceeds to step S1107.

In step S1107, the CPU 302 changes the setup content of the setting support function corresponding to the sheet holding unit whose button has been determined as being pressed in step S1105 from "valid" to "invalid" and stores the updated setting result in the HDD 308 of the printing apparatus 102. Then, after completing the processing in step S1107, the operation returns to step S1103 and the CPU 302 performs the above-mentioned processing again.

On the other hand, if the CPU 302 determines that the setting is invalid in step S1106, the operation proceeds to step S1108.

In step S1108, the CPU 302 changes the setup content of the setting support function corresponding to the sheet holding unit whose button has been determined as being pressed in step S1105 from "invalid" to "valid" and stores the updated setting result in the HDD 308 of the printing apparatus 102. Then, after completing the processing in step S1108, the operation returns to step S1103 and the CPU 302 performs the above-mentioned processing again.

As mentioned above, the printing apparatus 102 can perform the line of processing for validating or invalidating the setting support function for each sheet holding unit. However, the processing for validating or invalidating the setting support function for each sheet holding unit is not limited to the above-mentioned example.

For example, the server 101 can display a selection screen 1210 illustrated in FIG. 12B on the operation unit 209 thereof. Then, the server 101 can accept a pressing of a setting support function validation button 1211 or a setting support function invalidation button 1212 on the selection screen 1210 and then perform processing for validating or invalidating the setting support function for each sheet holding unit based on the button operation. Alternatively, the information processing apparatus 104 can display the selection screen 1210 illustrated in FIG. 12B on an operation unit (not illustrated) thereof. Then, the information processing apparatus 104 can perform processing for validating or invalidating the setting support function for each sheet holding unit.

The printing apparatus 102 can perform processing similar to the above-mentioned processing performed by the server 101. More specifically, in performing the above-mentioned processing, "the CPU 302" and "the operation unit 318" of the printing apparatus 102 are functionally comparable to "the CPU 207" and "the operation unit 209" of the server 101.

Subsequently, exemplary processing for validating or invalidating the setting support function for each sheet holding unit on the operation unit 318 of the printing apparatus 102 is described in detail below with reference to the attribute table 810 illustrated in FIG. 8B and the setup screen 1200 illustrated in FIG. 12A. As understood from the attribute table 810 illustrated in FIG. 8B, there is not any sheet registered in association with sheet holding unit "Tray2" in the sheet holding unit information storing unit 402. Therefore, as illustrated in FIG. 12A, the button 1202 corresponding to the sheet holding unit 2 is grayed out on the setup screen 1200 to prevent the button 1202 from being pressed.

On the other hand, as illustrated in FIG. 12A, the button 1201 corresponding to the sheet holding unit 1 is OFF (invalid) on the setup screen 1200. Therefore, the setup content of the setting support function corresponding to the sheet holding unit 1 is "invalid." In this case, if the button 1201 corresponding to the sheet holding unit 1 is pressed on the setup screen 1200, the display is switched from OFF (invalid) to ON (valid). More specifically, the setup content of the setting support function corresponding to the sheet holding unit 1 is changed from "invalid" to "valid."

In a case where the sheet holding unit 1 being valid with respect to the setting support function is used to execute a job, specific sheet attribute information acquired through the setting support function processing is set as sheet holding unit setting value in response to a shutting operation of the sheet holding unit from an opened state. For example, it is now presumed that the sheet holding unit 1 is first opened and A4-sized sheets are stored in the opened sheet holding unit 1, and then the sheet holding unit 1 is shut finally.

Subsequently, the A4-sized sheet registered in association with the sheet holding unit 1 in the sheet holding unit information storing unit 402 can be identified from the attribute table 810 illustrated in FIG. 8B based on the size (A4) of the detected (acquired) sheet. Then, the identified sheet attribute information (size: A4, grammage: 62 g/m$^2$, color: White, and type: plain paper) can be received from the server 101. The setup content of the setting support function corresponding to the sheet holding unit 1 is valid. Therefore, the received sheet attribute information can be set as setting value of the sheet holding unit 1.

On the other hand, as illustrated in FIG. 12A, the button 1204 corresponding to the sheet holding unit 4 is ON (valid) on the setup screen 1200. Therefore, the setup content of the setting support function corresponding to the sheet holding unit 4 is "valid." In this case, if the button 1204 corresponding to the sheet holding unit 4 is pressed on the setup screen 1200, the display is switched ON (valid) to OFF (invalid). More specifically, the setup content of the setting support function corresponding to the sheet holding unit 4 is changed from "valid" to "invalid."

In a case where the sheet holding unit 4 being invalid with respect to the setting support function is used to execute a job, no sheet holding unit setting value is set though the setting support function processing in response to a shutting operation of sheet holding unit from an opened state. For example, it is now presumed that the sheet holding unit 4 is first opened and A4-sized sheets are stored in the opened sheet holding unit 4, and then the sheet holding unit 4 is shut finally.

Subsequently, the A4-sized sheet registered in association with the sheet holding unit 4 in the sheet holding unit information storing unit 402 can be identified from the attribute table 810 illustrated in FIG. 8B based on the detected (acquired) sheet size (A4). Then, the identified sheet attribute information (size: A4, grammage: 62 g/m$^2$, color: White, and type: plain paper) can be received from the server 101. In this case, the setup content of the setting support function corresponding to the sheet holding unit 4 is invalid. Therefore, the received sheet attribute information cannot be set as setting value of the sheet holding unit 4.

It is feasible to perform control in such a way as to prevent the identified sheet attribute information from being received from the server 101 when the setup content of the setting support function is invalid. In other words, it is feasible to perform a control in such a way as to prevent the sheet holding unit setting value from being set through the setting support function processing.

Figure 13A:
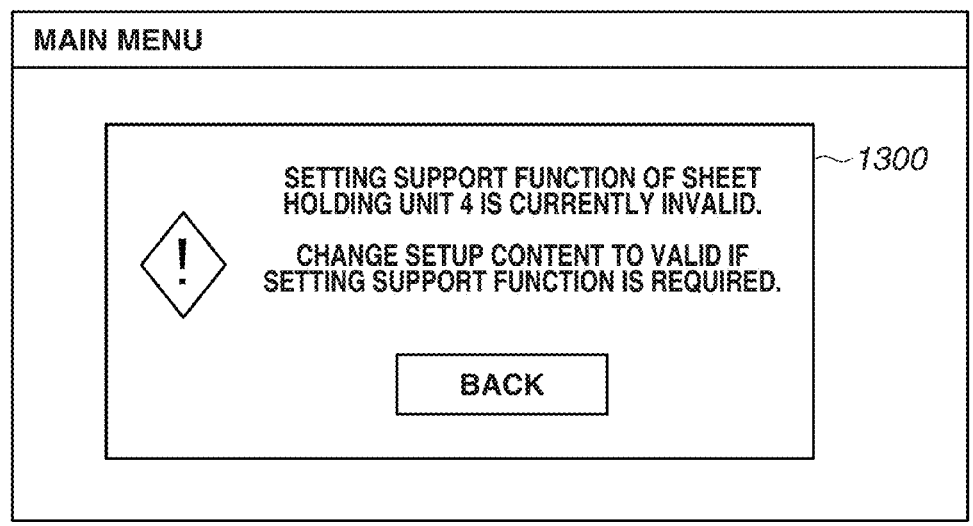
FIGS. 13A and 13B illustrate warning screens that can be displayed on an operation unit according to the first exemplary embodiment.
Figure 13B:
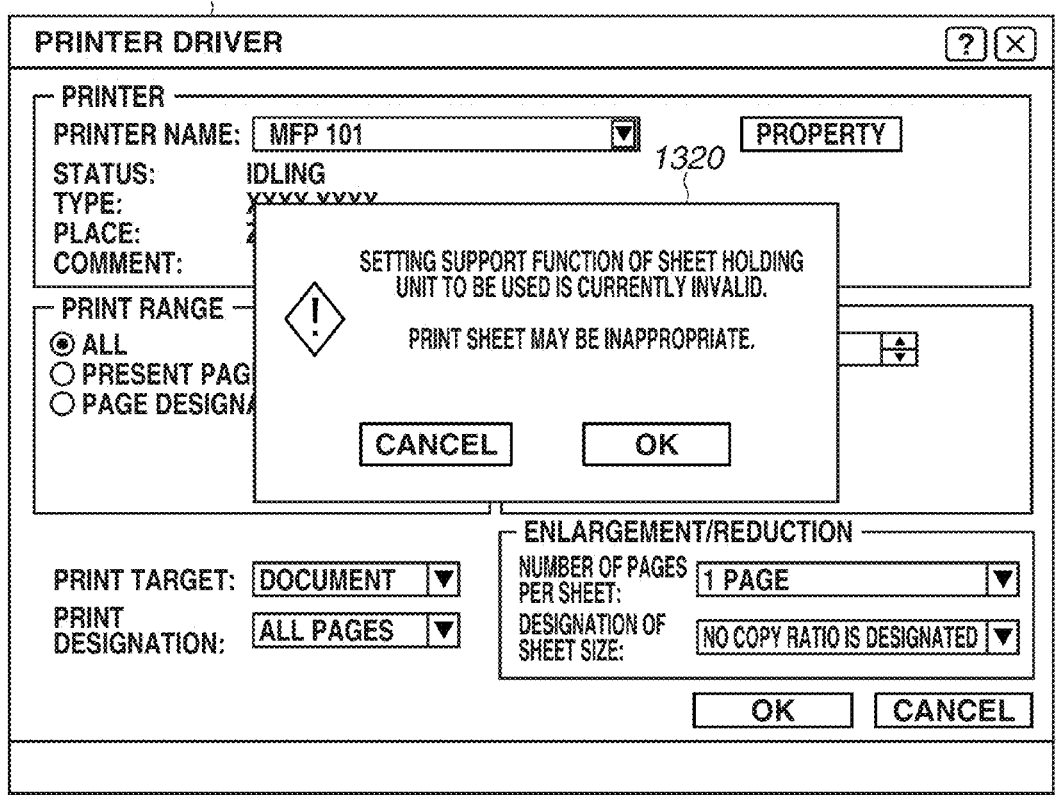

When the setup content of the setting support function corresponding to a specific sheet holding unit is invalid, it is useful to display a warning screen 1300 illustrated in FIG. 13A on the operation unit 318 of the printing apparatus 102 to notify a user of invalidity of the setting support function. Alternatively, it is useful to display a warning screen 1320 before the execution of a job is instructed via a printer driver screen 1310 illustrated in FIG. 13B displayed on the operation unit 209 of the server 101 or on the operation unit (not illustrated) of the information processing apparatus 104. Thus, the user can know the currently invalidated state with respect to the setting support function of the sheet holding unit to be used in the job.

As mentioned above, in the first exemplary embodiment, in a case where the setup content of the setting support function is set to be "valid" for a sheet holding unit, specific sheet attribute information is set as sheet holding unit setting value through the setting support function processing in response to a shutting operation of the sheet holding unit. On the other hand, in a case where the setup content of the setting support function is set to be "invalid" for a sheet holding unit, the above-mentioned sheet holding unit setting value is not set through the setting support function processing. Accordingly, it is feasible to differentiate the setting value of the shut sheet holding unit setting operation for each sheet holding unit considering validity/invalidity of each sheet holding unit with respect to the setup content of the setting support function.

More specifically, in a case where frequently used sheets are stored in a sheet holding unit, it is feasible to easily set frequently used sheet attribute information as sheet holding unit setting value. Further, in a case where not frequently used sheets are stored in a sheet holding unit, it is feasible to prevent the sheet setting value having been set through a user operation from being changed undesirably. Therefore, user convenience can be greatly improved.

In the first exemplary embodiment, the determination in step S906 (i.e., the processing for determining whether the setup content of the setting support function corresponding to the shut sheet holding unit is valid or invalid) has been performed after confirming the reception of the sheet attribute information from the server 101 in step S905. However, the processing to be performed is not limited to the above-mentioned example.

For example, the CPU 302 can perform processing comparable to the determination in step S906 (i.e., the processing for determining whether the setup content of the setting support function corresponding to the shut sheet holding unit is valid or invalid) after the CPU 302 confirms the response from the server 101 in step S904 and before the CPU 302 determines whether the sheet attribute information has been received from the server 101 in step S905.

Alternatively, the CPU 302 can perform processing comparable to the determination in step S906 (i.e., the processing for determining whether the setup content of the setting support function corresponding to the shut sheet holding unit is valid or invalid) after the CPU 302 detects (acquires) the size of sheets stored in the sheet holding unit in step S902 and before the CPU 302 transmits the detected (acquired) sheet size to the server 101 in step S903.

In any case, if it is determined that the setup content of the setting support function corresponding to the shut sheet holding unit is invalid, the CPU 302 can terminate the processing for setting the sheet attribute information uniquely identified with reference to the sheet holding unit information storing unit 402 as sheet holding unit setting value.

A second exemplary embodiment is described in detail below. As mentioned above, in the first exemplary embodiment, if the setup content of the setting support function is set to be valid for a sheet holding unit, specific sheet attribute information registered in the sheet holding unit information storing unit 402 is set as sheet holding unit setting value through the setting support function processing in response to a shutting operation of the sheet holding unit. On the other hand, if the setup content of the setting support function is set to be invalid for a sheet holding unit, the specific sheet attribute information registered in the sheet holding unit information storing unit 402 is not set as sheet holding unit setting value.

The second exemplary embodiment is similar to the first exemplary embodiment in that, if the setup content of the setting support function is set to be valid for a sheet holding unit, specific sheet attribute information registered in the sheet holding unit information storing unit 402 is set as sheet holding unit setting value through the setting support function processing in response to a shutting operation of the sheet holding unit. On the other hand, the second exemplary embodiment is different from the first exemplary embodiment in that, if the setup content of the setting support function is set to be invalid for a sheet holding unit, sheet attribute information registered in the sheet holding unit information storing unit 402 is temporarily set as sheet holding unit setting value and the sheet attribute information being set as sheet holding unit setting value is deleted later, as described in detail below.

Figure 5:
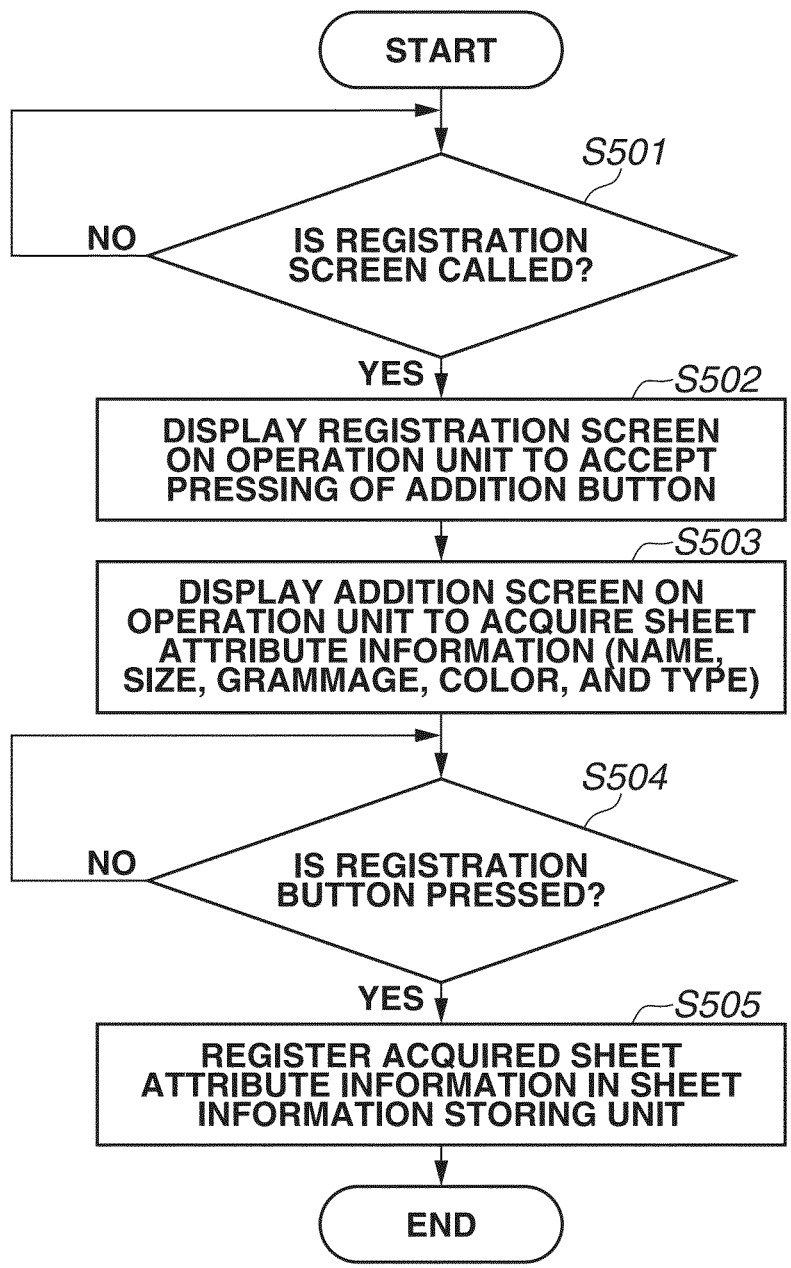
FIG. 5 is a flowchart illustrating exemplary processing for registering sheet attribute information in a sheet information storing unit, which can be performed by the server according to the first exemplary embodiment.

In the second exemplary embodiment, processing for registering sheet attribute information in the sheet information storing unit 401 provided in the HDD unit 205 of the server 101 (or the HDD 308 of the printing apparatus 102) can be performed according to a flowchart that is similar to the flowchart illustrated in FIG. 5 described in the first exemplary embodiment. Therefore, redundant description thereof will be avoided.

Figure 6:
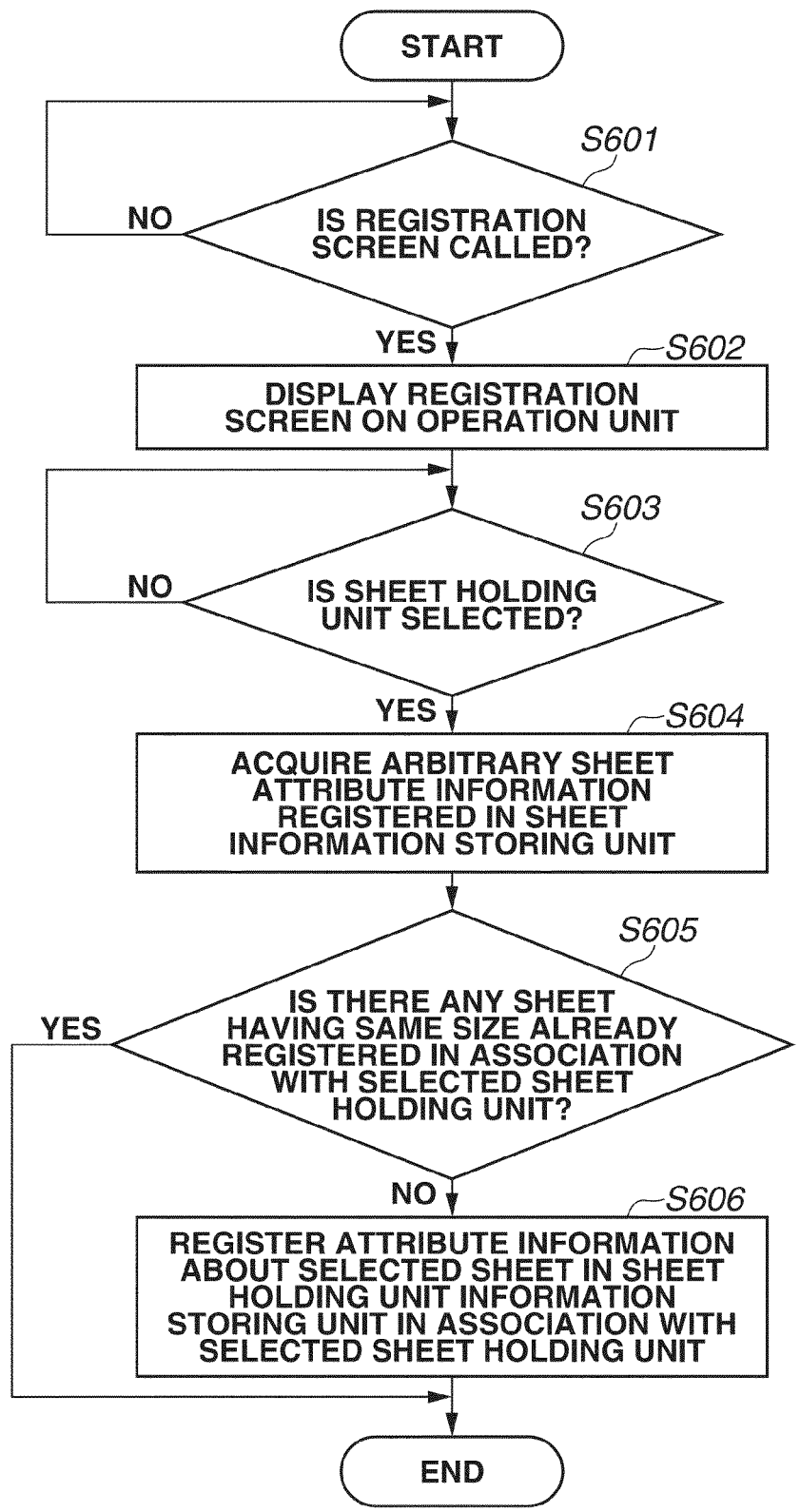
FIG. 6 is a flowchart illustrating exemplary processing for registering sheet attribute information in association with a corresponding sheet holding unit in a sheet holding unit information storing unit, which can be performed by the server according to the first exemplary embodiment.

Further, processing for registering sheet attribute information in association with each sheet holding unit in the sheet holding unit information storing unit 402 provided in the HDD unit 205 of the server 101 (or the HDD 308 of the printing apparatus 102) can be performed according to a flowchart that is similar to the flowchart illustrated in FIG. 6 described in the first exemplary embodiment. Therefore, redundant description thereof will be avoided.

In the server 101 according to the second exemplary embodiment, processing for searching for a sheet registered in the sheet holding unit information storing unit 402 can be performed according to a flowchart that is similar to the flowchart illustrated in FIG. 10 described in the first exemplary embodiment. Therefore, redundant description thereof will be avoided.

Further, in the printing apparatus 102 according to the second exemplary embodiment, processing for validating or invalidating the setting support function for each sheet holding unit can be performed according to a flowchart that is similar to the flowchart illustrated in FIG. 11 described in the first exemplary embodiment. Therefore, redundant description thereof will be avoided. Further, setting support function selection screens used in the second exemplary embodiment are similar to those illustrated in FIGS. 12A and 12B described in the first exemplary embodiment. Therefore, redundant description thereof will be avoided.

On the other hand, in the printing apparatus 102 according to the second exemplary embodiment, processing for setting sheet attribute information uniquely identified with reference to the sheet holding unit information storing unit 402 as sheet holding unit setting value can be performed according to a flowchart that is partly different from the flowchart illustrated in FIG. 9 described in the first exemplary embodiment.

The processing for setting sheet attribute information uniquely identified with reference to the sheet holding unit information storing unit 402 as sheet holding unit setting value, which can be performed by the printing apparatus 102 according to the second exemplary embodiment, is described in detail below with reference to a flowchart illustrated in FIG. 14.

The second exemplary embodiment is similar to the first exemplary embodiment in the processing to be performed in steps S901 to S905 (see FIG. 9). However, the second exemplary embodiment is different from the first exemplary embodiment in the processing to be performed in step S906 and subsequent steps as illustrated in FIG. 14. Therefore, the processing illustrated in FIG. 14 will not be described because the portion corresponding to steps S901 to S905 is similar to that already described in the first exemplary embodiment. Only the remaining part of FIG. 14 (i.e., the part not described in the first exemplary embodiment) will be described in detail below.

Figure 14:
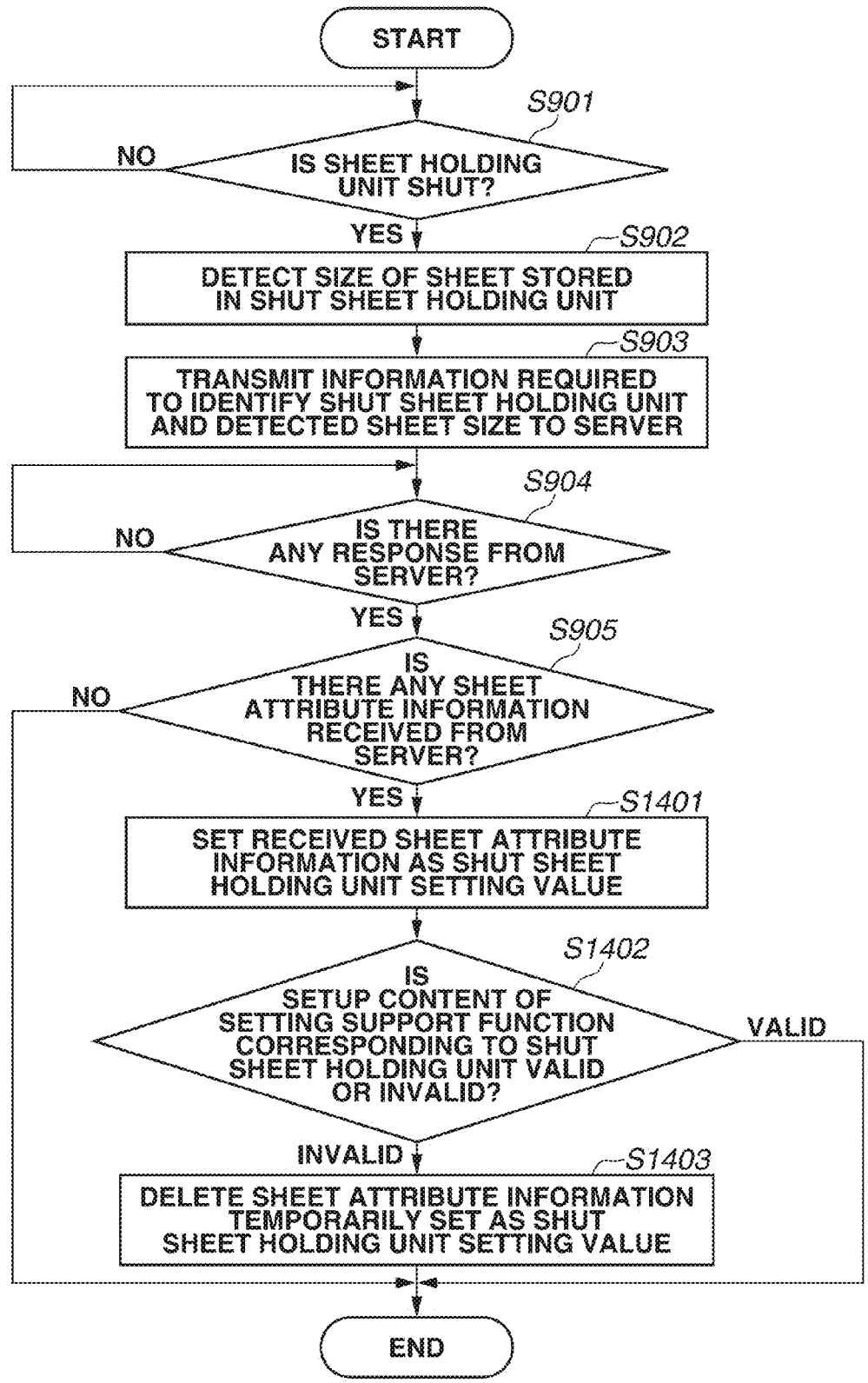
FIG. 14 is a flowchart illustrating exemplary processing for setting sheet attribute information uniquely identified with reference to the sheet holding unit information storing unit as sheet holding unit setting value, which can be performed by a printing apparatus according to a second exemplary embodiment.

In step S905 illustrated in FIG. 14, if the CPU 302 determines that the sheet attribute information has been received from the server 101 (more specifically, YES in step S905), the operation proceeds to step S1401.

In step S1401, the CPU 302 sets the sheet attribute information received from the server 101 in step S905 as shut sheet holding unit setting value. Then, the operation proceeds to step S1402. The processing to be performed in step S1401 corresponds to the processing in step S907 illustrated in FIG. 9.

In step S1402, the CPU 302 determines whether the setup content of the setting support function corresponding to the shut sheet holding unit is valid or invalid. The processing to be performed in step S1402 corresponds to step S906 illustrated in FIG. 9.

If in step S1402 the CPU 302 determines that the setup content of the setting support function corresponding to the shut sheet holding unit is valid, the CPU 302 terminates the processing for setting the sheet attribute information uniquely identified with reference to the sheet holding unit information storing unit 402 as sheet holding unit setting value. On the other hand, if in step S1402 the CPU 302 determines that the setup content of the setting support function corresponding to the shut sheet holding unit is invalid, the operation proceeds to step S1403.

In step S1403, the CPU 302 deletes the sheet attribute information received from the server 101 in step S905 illustrated in FIG. 14 (more specifically, sheet attribute information temporarily set as shut sheet holding unit setting value). In this case, the CPU 302 can display an appropriate indication or message on the operation unit 318 of the printing apparatus 102 to notify a user of the deletion of the sheet attribute information being temporarily set as sheet holding unit setting value.

Further, in a case where the sheet attribute information received from the server 101 has been deleted, it is useful to accept a user operation via the operation unit 318 of the printing apparatus 102 to set arbitrary sheet attribute information as the setting value of the shut sheet holding unit.

Alternatively, it is useful to acquire and set default sheet attribute information (e.g., "size: A4, grammage: 70 g/m², color: White, and type: plain paper") as the setting value of the shut sheet holding unit.

After completing the processing in step S1403, the CPU 302 terminates the processing for setting the sheet attribute information uniquely identified with reference to the sheet holding unit information storing unit 402 as sheet holding unit setting value.

As mentioned in details above, the second exemplary embodiment is partly different from the first exemplary embodiment in the processing performed by the printing apparatus 102 to set sheet attribute information uniquely identified with reference to the sheet holding unit information storing unit 402 as the setting value of the shut sheet holding unit.

After the sheet attribute information being temporarily set as the shut sheet holding unit setting value has been deleted in step S1403, the setup content of the setting support function corresponding to the shut sheet holding unit may be changed from "invalid" to "valid." In such a case, the operation returns to step S1401 again. The CPU 302 can set the sheet attribute information received from the server 101 in step S905 as a sheet holding unit setting value before performing the subsequent processing.

As mentioned above, the second exemplary embodiment is characterized in that, if the setup content of the setting support function is set to be valid for a sheet holding unit, specific sheet attribute information registered in the sheet holding unit information storing unit 402 is set as a sheet holding unit setting value through the setting support function processing in response to a shutting operation of the sheet holding unit. On the other hand, if the setup content of the setting support function is set to be invalid for a sheet holding unit, sheet attribute information registered in the sheet holding unit information storing unit 402 is temporarily set as sheet holding unit setting value. Further, the sheet attribute information being temporarily set as sheet holding unit setting value is deleted later.

Accordingly, it is feasible to differentiate the sheet holding unit setting value setting operation for each sheet holding unit considering validity/invalidity of each sheet holding unit with respect to the setup content of the setting support function.

A third exemplary embodiment is described in detail below. In the first exemplary embodiment, a user can set whether to validate or invalidate the setting support function for each sheet holding unit on the operation unit 318 of the printing apparatus 102 or on the selection screens (FIGS. 12A and 12B) displayed on the operation unit 209 of the server 101, as mentioned above.

On the other hand, the sheet holding unit may be opened and shut for a special purpose other than exchanging sheets stored in the sheet holding unit. For example, if the sheet holding unit open/shut time is shorter than a predetermined time, it can be presumed that the purpose of opening and shutting the sheet holding unit is to visually confirm the sheets stored in the sheet holding unit.

Further, if the sheet holding unit open/shut time is longer than a predetermined time, it can be presumed that the purpose of opening and shutting the sheet holding unit is to prevent any sheet from being fed from the sheet holding unit because of the execution of a job. Further, if the remaining amount of sheets at the opening timing of the sheet holding unit is zero (more specifically, when the sheet remaining amount is 0%), it can be presumed that the purpose of opening and shutting the sheet holding unit is to replenish the same sheets. In such cases, it is unnecessary to update and set sheet attribute information as sheet holding unit setting value because the exchange of sheets stored in the sheet holding unit has not been performed.

Therefore, control according to the third exemplary embodiment is characterized by determining whether to validate or invalidate the setting support function according to the sheet holding unit open/shut time or the sheet remaining amount at sheet holding unit opened timing, as described in detail below.

In the third exemplary embodiment, processing for registering sheet attribute information in the sheet information storing unit 401 provided in the HDD unit 205 of the server 101 (or in the HDD 308 of the printing apparatus 102) can be performed according to a flowchart that is similar to the flowchart illustrated in FIG. 5 described in the first exemplary embodiment. Therefore, redundant description thereof will be avoided. Further, processing for registering sheet attribute information in association with each sheet holding unit in the sheet holding unit information storing unit 402 provided in the HDD unit 205 of the server 101 (or the HDD 308 of the printing apparatus 102) can be performed according to a flowchart that is similar to the flowchart illustrated in FIG. 6 described in the first exemplary embodiment. Therefore, redundant description thereof will be avoided.

Figure 15:
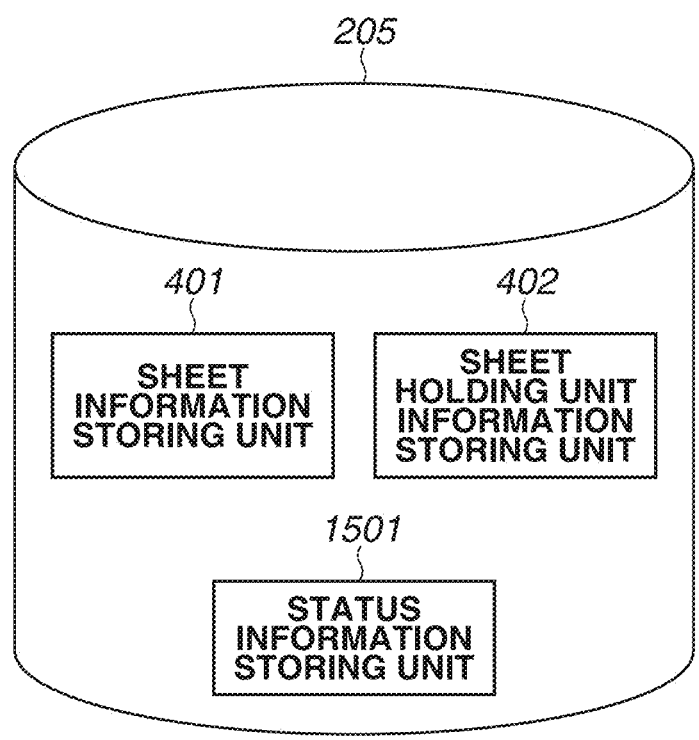
FIG. 15 illustrates a plurality of pieces of data stored in an HDD unit of the server according to a third exemplary embodiment.

On the other hand, in the third exemplary embodiment, as illustrated in FIG. 15, the HDD unit 205 of the server 101 includes a status information storing unit 1501 as independent storage area in addition to the sheet information storing unit 401 and the sheet holding unit information storing unit 402. A status table 1600 illustrated in FIG. 16 indicates information stored in the status information storing unit 1501. For example, the status table 1600 stores list format information about sheet holding unit opened time 1601, sheet holding unit shut time 1602, sheet remaining amount (at sheet holding unit opened timing) 1603, and sheet remaining amount (at sheet holding unit shut timing) 1604 for each sheet holding unit.

The status information storing unit 1501 can be stored as a storage area in the HDD 308 of the printing apparatus 102. Further, the status information storing unit 1501 can be stored in a comparable storage area of a nonvolatile memory (not illustrated) provided in the information processing apparatus 104. In such cases, the data stored in the status information storing unit 1501 can be referred to via the network 103.

In the server according to the third exemplary embodiment 101, processing for searching for a sheet registered in the sheet holding unit information storing unit 402 can be performed according to a flowchart that is similar to the flowchart illustrated in FIG. 10 described in the first exemplary embodiment. Therefore, redundant description thereof will be avoided.

On the other hand, the printing apparatus 102 according to the third exemplary embodiment performs processing for setting sheet attribute information uniquely identified with reference to the sheet holding unit information storing unit 402, as sheet holding unit setting value, which is different from the first exemplary embodiment in processing to be performed until the operation of the CPU 302 proceeds to step S902 when the determination result in step S901 is YES in FIG. 9.

Therefore, the processing for setting sheet attribute information uniquely identified with reference to the sheet holding unit information storing unit 402, as sheet holding unit setting value, which can be performed by the printing apparatus 102 according to the third exemplary embodiment, is described in detail below with reference to a flowchart illustrated in FIG. 17. The processing according to the third exemplary embodiment will not be described because the portion corresponding to step S902 and subsequent processing illustrated in FIG. 9 is already described in the first exemplary embodiment. Only the remaining part (i.e., the part not described in the first exemplary embodiment) will be described in detail below.

In step S901 illustrated in FIG. 9, the CPU 302 determines whether the sheet holding unit being in an opened state has been shut. If the CPU 302 determines that the sheet holding unit has been shut (more specifically, YES in step S901), the operation proceeds to step S1701 illustrated in FIG. 17.

In step S1701, the CPU 302 determines whether the condition for invalidating the setting support function is the sheet holding unit open/shut time or the sheet remaining amount at sheet holding unit opened timing. The condition for invalidating the setting support function can be arbitrarily selected (see 1810 and 1820) by a user on a setup screen 1800 illustrated in FIG. 18A. The setup screen 1800 illustrated in FIG. 18A is displayable on the operation unit 318 of the printing apparatus 102. However, the setup screen 1800 is not limited to the above-mentioned example. For example, the setup screen 1800 can be displayed on the operation unit 209 of the server 101 or on the operation unit (not illustrated) of the information processing apparatus 104. In this case, a setting value accepted on the setup screen 1800 can be received via the network 105.

If in step S1701 the CPU 302 determines that the condition for invalidating the setting support function is the sheet holding unit open/shut time, the operation proceeds to step S1702.

In step S1702, the CPU 302 refers to the status table 1600 stored in the status information storing unit 1501 and acquires information about the sheet holding unit opened time 1601 and the sheet holding unit shut time 1602. Then, the operation proceeds to step S1703. According to a status table 1600 illustrated in FIG. 16, the opened time and the shut time of the sheet holding unit 1 acquired by the CPU 302 are "2013/04/01, 10:05:30" and "2013/04/01, 10:08:42", respectively.

In step S1703, the CPU 302 acquires the open/shut time of the above-mentioned sheet holding unit based on the sheet holding unit opened time 1601 and the sheet holding unit shut time 1602 acquired in step S1702. Then, the operation proceeds to step S1704. According to the status table 1600 illustrated in FIG. 16, the open/shut time of the sheet holding unit 1 that can be acquired by the CPU 302 is 3 minutes and 12 seconds because the open/shut time is a difference between the opened time of the sheet holding unit 1 and the shut time of the sheet holding unit 1.

The calculation of the sheet holding unit open/shut time performed by the printing apparatus 102 is not limited to the above-mentioned example. For example, if the server 101 or the information processing apparatus 104 can calculate the sheet holding unit open/shut time beforehand, it is useful to receive the sheet holding unit open/shut time from the server 101 or the information processing apparatus 104 via the network 105.

In step S1704, the CPU 302 determines whether the open/shut time of the above-mentioned sheet holding unit (i.e., the time acquired in step S1703) is equal to or less than a setting time (1811) on the setup screen 1800. If the CPU 302 determines that the acquired open/shut time is equal to or less than the setting time (1811), the operation proceeds to step S1705. On the other hand, if the determination result in step S1704 is NO, the operation of the CPU 302 proceeds to step S1706.

In step S1705, the CPU 302 overwrites the setup content of the setting support function corresponding to the shut sheet holding unit with "invalid." Then, the operation proceeds to step S902 illustrated in FIG. 9 to perform the subsequent processing. The updated setup content of the setting support function corresponding to the shut sheet holding unit can be stored in the HDD 308 of the printing apparatus 102.

In step S1706, the CPU 302 determines whether the open/shut time of the above-mentioned sheet holding unit acquired in step S1703 is equal to or greater than a setting time (1812) on the setup screen 1800. If the CPU 302 determines that the acquired open/shut time is equal to or greater than the setting time (1812) (YES in step S1706), the operation proceeds to step S1705. On the other hand, if the determination result in step S1706 is NO, the operation of the CPU 302 proceeds to step S1707.

In step S1707, the CPU 302 overwrites the setup content of the setting support function corresponding to the shut sheet holding unit with "valid." Then, the operation proceeds to step S902 illustrated in FIG. 9 to perform the subsequent processing. The updated setup content of the setting support function corresponding to the shut sheet holding unit can be stored in the HDD 308 of the printing apparatus 102.

On the other hand, if in step S1701 the CPU 302 determines that the condition for invalidating the setting support function is the sheet remaining amount at sheet holding unit opened timing, the operation proceeds to step S1708.

In step S1708, the CPU 302 refers to the status table 1600 stored in the status information storing unit 1501 and acquires information about the sheet remaining amount (at sheet holding unit opened timing) 1603. Then, the operation proceeds to step S1709. According to the status table 1600 illustrated in FIG. 16, the sheet remaining amount at the opening timing of the sheet holding unit 1 that can be acquired by the CPU 302 is "0% (remaining amount zero)."

In step S1709, the CPU 302 determines whether the sheet remaining amount 1603 acquired in step S1708 is zero. If the CPU 302 determines that the sheet remaining amount 1603 is zero (YES instep S1709), the operation proceeds to step S1710. On the other hand, if the determination result in step S1709 is NO, the operation of the CPU 302 proceeds to step S1711.

In step S1710, the CPU 302 overwrites the setup content of the setting support function corresponding to the shut sheet holding unit with "invalid." Then, the operation proceeds to step S902 illustrated in FIG. 9 to perform the subsequent processing. The updated setup content of the setting support function corresponding to the shut sheet holding unit can be stored in the HDD 308 of the printing apparatus 102.

In step S1711, the CPU 302 overwrites the setup content of the setting support function corresponding to the shut sheet holding unit with "valid." Then, the operation proceeds to step S902 illustrated in FIG. 9 to perform the subsequent processing. The updated setup content of the setting support function corresponding to the shut sheet holding unit can be stored in the HDD 308 of the printing apparatus 102.

As mentioned above, the printing apparatus 102 according to the third exemplary embodiment can perform processing for setting specific sheet attribute information registered in the sheet holding unit information storing unit 402, as sheet holding unit setting value, which is partly different from that described in the first exemplary embodiment.

As mentioned above, the control according to the third exemplary embodiment can determine whether to validate or invalidate the setting support function based on the sheet holding unit open/shut time or the sheet remaining amount at sheet holding unit opened timing. The condition for invalidating the setting support function is not limited to the above-mentioned example (i.e., the sheet holding unit open/shut time or the sheet remaining amount at sheet holding unit opened timing).

According to a modified embodiment, it is feasible to perform control in such a way as to determine whether to validate or invalidate the setting support function with reference to both of the sheet holding unit open/shut time and the sheet remaining amount at sheet holding unit opened timing.

For example, the control can be performed in such a way as to overwrite the setup content of the setting support function corresponding to the shut sheet holding unit with "invalid" only when the sheet holding unit open/shut time is equal to or less/greater than a predetermined time and the sheet remaining amount at sheet holding unit opened timing is zero.

Further, the condition for invalidating the setting support function is not limited to the above-mentioned example (i.e., the sheet remaining amount when the sheet holding unit is opened is zero). A setup screen 1830 illustrated in FIG. 18B can be called when a change button 1821 is pressed on the setup screen 1800 illustrated in FIG. 18A. A user can select either remaining amount=zero (1831) or remaining amount≠zero (1832) with respect to the sheet remaining amount at sheet holding unit opened timing. In other words, the setup screen 1830 enables a user to arbitrarily set the condition for invalidating the setting support function.

Further, the control can be performed in such a way as to validate or invalidate the setting support function by determining whether a difference between a sheet remaining amount at sheet holding unit opened timing and a sheet remaining amount at sheet holding unit shut timing is large or small in addition to whether the sheet remaining amount at sheet holding unit opened timing is not zero.

The difference between the sheet remaining amount at sheet holding unit opened timing and the sheet remaining amount at sheet holding unit shut timing can be calculated by acquiring the sheet remaining amount (at sheet holding unit opened timing) 1603 and the sheet remaining amount (at sheet holding unit shut timing) 1604 with reference to the status table 1600.

The present invention is not limited to the above-mentioned exemplary embodiments. Each exemplary embodiment can be modified in various ways within the scope of the present invention. For example, two or more of the above-mentioned exemplary embodiments can be combined appropriately. The present invention encompasses such a composite embodiment.

For example, detectable (acquirable) attribute information about a sheet stored in a sheet holding unit is not limited to only the size. For example, it is useful to detect (acquire) and transmit a plurality of pieces of attribute information. The subsequent processing can be performed based on the detected (acquired) plurality of pieces of attribute information.

Further, for example, the information to be transmitted to the server 101 is not limited to the above-mentioned example (i.e., the size of sheets stored in the sheet holding unit). For example, the sensor provided in each sheet holding unit may be able to detect another characteristic feature (e.g., color, grammage, or type) of each sheet and additional sheet information about color, grammage, or type may be registered beforehand in the sheet information storing unit 401 or the sheet holding unit information storing unit 402.

In such a case, it is useful to transmit the additional sheet information about color, grammage, or type together with the sheet size to the server 101 so that a sheet can be identified based on both of the sheet size and the sheet color, grammage, or type. Further, it is useful to transmit only the sheet color information to the server 101 so that a sheet can be identified based on only the sheet color.

More specifically, in a case where at least one of sheet size, grammage, color, and type is acquired as attribute information about a sheet stored in the sheet holding unit, additional attribute information other than the acquired attribute information can be set as sheet holding unit setting value.

Further, for example, the connection between the printing apparatus 102 and the server 101 (i.e., the externally provided apparatus) via the network 105 can be modified in various ways. For example, the server 101 can be provided as a built-in printing control apparatus in the printing apparatus 102. In such a case, the printing apparatus 102 and the server 101 can be configured to perform a part or the whole of the above-mentioned various control processing.

Further, the printing apparatus 102 can be configured to perform a part or the whole of the above-mentioned various control processing without relying on the processing to be performed by the server 101 (i.e., the printing control apparatus). More specifically, the printing apparatus 102 or the information processing apparatus 104 can be configured to include the server 101 that is functionally operable as a printing control apparatus. Further, the printing apparatus 102 can be connected with a plurality of information processing apparatuses 104 via the network 103 (e.g., LAN or WAN) or a wireless LAN in such a way as to perform a part or the whole of the above-mentioned various control processing.

Although the present invention has been described based on various examples and exemplary embodiments, it will not be difficult for a person skilled in the art to add various modifications without departing from the gist of the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254563 filed Dec. 9, 2013, which is hereby incorporated by reference herein in its entirety.

What is claimed is:

1. A printing system comprising:
a printing apparatus configured to print an image on a sheet conveyed from a sheet holding unit, wherein the printing apparatus includes:

an obtaining unit configured to obtain a size of a sheet stored in a sheet holding unit of the printing apparatus, and a first sending unit configured to send the size obtained by the obtaining unit to a printing control apparatus; and the printing control apparatus, wherein the printing control apparatus includes:

a storing unit configured to store a size of a sheet and attribute information of the sheet, a first receiving unit configured to receive the size sent by the first sending unit, a determining unit configured to determine attribute information of a sheet based on the size received by the first receiving unit, wherein the attribute information of the sheet is stored in association with the size received by the first receiving unit in the storing unit, and a second sending unit configured to send, to the printing apparatus, the attribute information determined by the determining unit, wherein the printing apparatus further includes:

a second receiving unit configured to receive the attribute information sent by the second sending unit, a setting unit configured to set the attribute information received by the second receiving unit as attribute information of a sheet stored in the sheet holding unit, a printing unit configured to print, based on the attribute information set by the setting unit, an image on a sheet conveyed from the sheet holding unit, and an instruction receiving unit configured to receive, from a user, an instruction indicating whether a function is enabled or disabled, wherein the function is for setting attribute information of a sheet stored in association with the size obtained by the obtaining unit in the storing unit as attribute information of a sheet stored in the sheet holding unit, wherein, in a case where the instruction receiving unit receives an instruction indicating that the function is enabled, the setting unit sets the attribute information of the sheet stored in association with the size obtained by the obtaining unit in the storing unit as attribute information of a sheet stored in the sheet holding unit, wherein, in a case where the instruction receiving unit receives an instruction indicating that the function is disabled, the setting unit does not set the attribute information of the sheet stored in association with the size obtained by the obtaining unit in the storing unit as attribute information of a sheet stored in the sheet holding unit, and wherein at least one of the obtaining unit, the first sending unit, the first receiving unit, the determining unit, the second sending unit, the second receiving unit, the setting unit, and the instruction receiving unit is implemented by a processor and a memory.

2. The printing system according to claim 1, wherein the instruction receiving unit receives the instruction in association with each of a first sheet holding unit and a second sheet holding unit of the printing apparatus, wherein, in a case where the instruction receiving unit receives the instruction indicating that the function is enabled for the first sheet holding unit, the setting unit sets the attribute information of the sheet stored in association with the size obtained by the obtaining unit in the storing unit as attribute information of a sheet stored in the first sheet holding unit, and wherein, in a case where the instruction receiving unit receives the instruction indicating that the function is disabled for the second sheet holding unit, the setting unit does not set the attribute information of the sheet stored in association with the size obtained by the obtaining unit in the storing unit as attribute information of a sheet stored in the second sheet holding unit.

3. The printing system according to claim 1, wherein, in a case where the instruction receiving unit receives the instruction indicating that the function is disabled, the first sending unit does not send the size obtained by the obtaining unit.

4. The printing system according to claim 1, wherein the printing apparatus further includes a notification unit, and wherein, in a case where the instruction receiving unit receives the instruction indicating that the function is disabled, the notification unit notifies a user that the function is disabled.

5. The printing system according to claim 1, wherein the printing control apparatus further includes a notification unit, and wherein, in a case where the instruction receiving unit receives the instruction indicating that the function is disabled, the notification unit notifies a user that the function is disabled.

6. The printing system according to claim 1, wherein the printing apparatus further includes a detection unit configured to detect a shut state of the sheet holding unit, and wherein the obtaining unit obtains the size of the sheet stored in the sheet holding unit in accordance with the shut state of the sheet holding unit detected by the detection unit.

7. The printing system according to claim 1, wherein the attribute information includes at least one of sheet grammage, sheet color, and sheet type.

8. A printing apparatus configured to print an image on a sheet conveyed from a sheet holding unit, the printing apparatus comprising:

an obtaining unit configured to obtain a size of a sheet stored in a sheet holding unit;

a sending unit configured to send the size obtained by the obtaining unit to a printing control apparatus;

a receiving unit configured to receive, from the printing control apparatus, attribute information of a sheet;

a setting unit configured to set the attribute information received by the receiving unit as attribute information of a sheet stored in the sheet holding unit;

a printing unit configured to print, based on the attribute information set by the setting unit, an image on a sheet conveyed from the sheet holding unit; and an instruction receiving unit configured to receive, from a user, an instruction indicating whether a function is enabled or disabled, wherein the function is for setting attribute information of a sheet stored in association with the size obtained by the obtaining unit in a storing unit as attribute information of a sheet stored in the sheet holding unit, wherein, in a case where the instruction receiving unit receives an instruction indicating that the function is enabled, the setting unit sets the attribute information of the sheet stored in association with the size obtained by the obtaining unit in the storing unit as attribute information of a sheet stored in the sheet holding unit, wherein, in a case where the instruction receiving unit receives an instruction indicating that the function is disabled, the setting unit does not set the attribute information of the sheet stored in association with the size obtained by the obtaining unit in the storing unit as attribute information of a sheet stored in the sheet holding unit, and wherein at least one of the obtaining unit, the sending unit, the receiving unit, the setting unit, and the instruction receiving unit is implemented by a processor and a memory.

9. The printing apparatus according to claim 8, wherein, in a case where the instruction receiving unit receives the instruction indicating that the function is disabled, the first sending unit does not send the size obtained by the obtaining unit.

10. The printing apparatus according to claim 8, further comprising a notification unit,
wherein, in a case where the instruction receiving unit receives the instruction indicating that the function is disabled, the notification unit notifies a user that the function is disabled.

11. The printing apparatus according to claim 8, wherein the attribute information includes at least one of sheet grammage, sheet color, and sheet type.

12. A printing control apparatus comprising:
a storing unit configured to store a size of a sheet and attribute information of the sheet;
a receiving unit configured to receive, from a printing apparatus, a size of a sheet stored in a sheet holding unit of the printing apparatus;
a determining unit configured to determine attribute information of a sheet based on the size received by the receiving unit, wherein the attribute information of the sheet is stored in association with the size received by the receiving unit in the storing unit;
a sending unit configured to send, to the printing apparatus, the attribute information determined by the determining unit; and
an instruction receiving unit configured to receive, from a user, an instruction indicating whether a function is enabled or disabled, wherein the function is for setting attribute information of a sheet stored in association with the size of the sheet stored in the sheet holding unit in the storing unit as attribute information of a sheet stored in the sheet holding unit,
wherein, in a case where the instruction receiving unit receives an instruction indicating that the function is enabled, the sending unit sends the attribute information determined by the determining unit to the printing apparatus,
wherein, in a case where the instruction receiving unit receives an instruction indicating that the function is disabled, the sending unit does not send the attribute information determined by the determining unit to the printing apparatus, and
wherein at least one of the receiving unit, the determining unit, the sending unit, and the instruction receiving unit is implemented by a processor and a memory.

13. The printing control apparatus according to claim 12, wherein the attribute information includes at least one of sheet grammage, sheet color, and sheet type.

14. A printing apparatus configured to print an image on a sheet conveyed from a sheet holding unit, the printing apparatus comprising:
a storing unit configured to store a size of a sheet and attribute information of the sheet;
an obtaining unit configured to obtain a size of a sheet stored in a sheet holding unit;
a determining unit configured to determine attribute information of a sheet based on the size obtained by the obtaining unit, wherein the attribute information of the sheet is stored in association with the size obtained by the obtaining unit in the storing unit;
a setting unit configured to set the attribute information determined by the determining unit as attribute information of a sheet stored in the sheet holding unit;
a printing unit configured to print, based on the attribute information set by the setting unit, an image on a sheet conveyed from the sheet holding unit; and
an instruction receiving unit configured to receive, from a user, an instruction indicating whether a function is enabled or disabled, wherein the function is for setting attribute information of a sheet stored in association with the size obtained by the obtaining unit in the storing unit as attribute information of a sheet stored in the sheet holding unit,
wherein, in a case where the instruction receiving unit receives an instruction indicating that the function is enabled, the setting unit sets the attribute information of the sheet stored in association with the size obtained by the obtaining unit in the storing unit as attribute information of a sheet stored in the sheet holding unit,
wherein, in a case where the instruction receiving unit receives an instruction indicating that the function is disabled, the setting unit does not set the attribute information of the sheet stored in association with the size obtained by the obtaining unit in the storing unit as attribute information of a sheet stored in the sheet holding unit, and
wherein at least one of the obtaining unit, the determining unit, the setting unit, and the instruction receiving unit is implemented by a processor and a memory.

15. A printing system comprising:
a printing apparatus configured to print an image on a sheet conveyed from a sheet holding unit, wherein the printing apparatus includes:
an obtaining unit configured to obtain a size of a sheet stored in a sheet holding unit of the printing apparatus, and
a first sending unit configured to send the size obtained by the obtaining unit to a printing control apparatus; and
the printing control apparatus, wherein the printing control apparatus includes:
a storing unit configured to store a size of the a sheet and attribute information of the sheet,
a first receiving unit configured to receive the size sent by the first sending unit,
a determining unit configured to determine attribute information of a sheet based on the size received by the first receiving unit, wherein the attribute information of the sheet is stored in association with the size received by the first receiving unit in the storing unit, and
a second sending unit configured to send, to the printing apparatus, the attribute information determined by the determining unit,
wherein the printing apparatus further includes:
a second receiving unit configured to receive the attribute information sent by the second sending unit,
a setting unit configured to set the attribute information received by the second receiving unit as attribute information of a sheet stored in the sheet holding unit,
a printing unit configured to print, based on the attribute information set by the setting unit , an image on a sheet conveyed from the sheet holding unit, and a second determining unit configured to determine whether a time interval between open and shut of the sheet holding unit is more than a predetermined time,
wherein, in a case where the second determining unit determines that the time interval between open and shut of the sheet holding unit is more than the predetermined time, the setting unit sets the attribute information of the sheet stored in association with the size obtained by the obtaining unit in the storing unit as attribute information of a sheet stored in the sheet holding unit, wherein, in a case where the second determining unit determine that the time interval between open and shut of the sheet holding unit is not more than the predetermined time, the setting unit does not set the attribute information of the sheet stored in association with the size obtained by the obtaining unit in the storing unit as attribute information of a sheet stored in the sheet holding unit, and wherein at least one of the obtaining unit, the first sending unit, the first receiving unit, the determining unit, the second sending unit, the second receiving unit, the setting unit, and the second determining unit is implemented by a processor and a memory.

16. A printing system comprising:

a printing apparatus configured to print an image on a sheet conveyed from a sheet holding unit, wherein the printing apparatus includes:

an obtaining unit configured to obtain a size of a sheet stored in a sheet holding unit of the printing apparatus, and a first sending unit configured to send the size obtained by the obtaining unit to a printing control apparatus; and the printing control apparatus, wherein the printing control apparatus includes:

a storing unit configured to store a size of a sheet and attribute information and of the sheet, a first receiving unit configured to receive the size sent by the first sending unit, a determining unit configured to determine attribute information of a sheet based on the size received by the first receiving unit, wherein the attribute information of the sheet is stored in association with the size received by the first receiving unit in the storing unit, and a second sending unit configured to send, to the printing apparatus, the attribute information determined by the determining unit, wherein the printing apparatus further includes:

a second receiving unit configured to receive the attribute information sent by the second sending unit, a setting unit configured to set the attribute information received by the second receiving unit as attribute information of a sheet stored in the sheet holding unit, a printing unit configured to print, based on the attribute information set by the setting unit, an image on a sheet conveyed from the sheet holding unit, and a second determining unit configured to determine whether a number of sheets stored in the sheet holding unit is more than a predetermined number of sheets when the sheet holding unit is opened, wherein, in a case where the second determining unit determines that the number of sheets stored in the sheet holding unit is more than the predetermined number of sheets when the sheet holding unit is opened, the setting unit sets the attribute information of the sheet stored in association with the size obtained by the obtaining unit in the storing unit as attribute information of a sheet stored in the sheet holding unit, wherein, in a case where the second determining unit determines that the number of sheets stored in the sheet holding unit is not more than the predetermined number of sheets when the sheet holding unit is opened, the setting unit does not set the attribute information of the sheet stored in association with the size obtained by the obtaining unit in the storing unit as attribute information of a sheet stored in the sheet holding unit, and wherein at least one of the obtaining unit, the first sending unit, the first receiving unit, the determining unit, the second sending unit, the second receiving unit, the setting unit, and the second determining unit is implemented by a processor and a memory.

17. A method for controlling a printing apparatus configured to print an image on a sheet conveyed from a sheet holding unit, the method comprising:

obtaining a size of a sheet stored in a sheet holding unit;

sending the obtained size to a printing control apparatus;

receiving, from the printing control apparatus, attribute information of a sheet;

setting the received attribute information as attribute information of a sheet stored in the sheet holding unit;

printing, based on the set attribute information, an image on a sheet conveyed from the sheet holding unit; and receiving, from a user, an instruction indicating whether a function is enabled or disabled, wherein the function is for setting attribute information of a sheet stored in association with the obtained size in a storing unit as attribute information of a sheet stored in the sheet holding unit, wherein, in a case where the instruction received is an instruction indicating that the function is enabled, setting includes setting the attribute information of the sheet stored in association with the obtained size in the storing unit as attribute information of a sheet stored in the sheet holding unit, and wherein, in a case where the instruction received is an instruction indicating that the function is disabled, setting includes not setting the attribute information of the sheet stored in association with the obtained size in the storing unit as attribute information of a sheet stored in the sheet holding unit.

18. A method for controlling a printing control apparatus, the method comprising:

storing, in a storing unit, a size of a sheet and attribute information of the sheet;

receiving, from a printing apparatus, a size of a sheet stored in a sheet holding unit of the printing apparatus;

determining attribute information of a sheet based on the received size, wherein the attribute information of the sheet is stored in association with the received size in the storing unit;

sending, to the printing apparatus, the determined attribute information; and receiving, from a user, an instruction indicating whether a function is enabled or disabled, wherein the function is for setting attribute information of a sheet stored in association with the size of the sheet stored in the sheet holding unit in the storing unit as attribute information of a sheet stored in the sheet holding unit, wherein, in a case where the instruction received is an instruction indicating that the function is enabled, sending includes sending the determined attribute information to the printing apparatus, and wherein, in a case where the instruction received is an instruction indicating that the function is disabled, sending includes not sending the determined attribute information to the printing apparatus.

19. A non-transitory computer readable storage medium storing a program to cause a printing apparatus, configured to print an image on a sheet conveyed from a sheet holding unit, to perform a method, the method comprising:

obtaining a size of a sheet stored in a sheet holding unit;

sending the obtained size to a printing control apparatus;

receiving, from the printing control apparatus, attribute information of a sheet;

setting the received attribute information as attribute information of a sheet stored in the sheet holding unit;

printing, based on the set attribute information, an image on a sheet conveyed from the sheet holding unit; and receiving, from a user, an instruction indicating whether a function is enabled or disabled, wherein the function is for setting attribute information of a sheet stored in association with the obtained size in a storing unit as attribute information of a sheet stored in the sheet holding unit, wherein, in a case where the instruction received is an instruction indicating that the function is enabled, setting includes setting the attribute information of the sheet stored in association with the obtained size in the storing unit as attribute information of a sheet stored in the sheet holding unit, and wherein, in a case where the instruction received is an instruction indicating that the function is disabled, setting includes not setting the attribute information of the sheet stored in association with the obtained size in the storing unit as attribute information of a sheet stored in the sheet holding unit.

20. A non-transitory computer readable storage medium storing a program to cause a printing control apparatus to perform a method, the method comprising:

storing, in a storing unit, a size of a sheet and attribute information of the sheet;

receiving, from a printing apparatus, a size of a sheet stored in a sheet holding unit of the printing apparatus;

determining attribute information of a sheet based on the received size, wherein the attribute information of the sheet is stored in association with the received size in the storing unit;

sending, to the printing apparatus, the determined attribute information; and receiving, from a user, an instruction indicating whether a function is enabled or disabled, wherein the function is for setting attribute information of a sheet stored in association with the size of the sheet stored in the sheet holding unit in the storing unit as attribute information of a sheet stored in the sheet holding unit, wherein, in a case where the instruction received is an instruction indicating that the function is enabled, sending includes sending the determined attribute information to the printing apparatus, and wherein, in a case where the instruction received is an instruction indicating that the function is disabled, sending includes not sending the determined attribute information to the printing apparatus.

* * * * *